United States Patent
Kusakabe et al.

(10) Patent No.: US 6,269,012 B1
(45) Date of Patent: Jul. 31, 2001

(54) ENERGY EFFICIENT POWER SUPPLY WITH LIGHT-LOAD DETECTION

(75) Inventors: Hiromi Kusakabe, Yokohama; Osamu Hosohata, Kamakura, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/597,838

(22) Filed: Jun. 20, 2000

(30) Foreign Application Priority Data

Jun. 29, 1999 (JP) .................................. 11-183918
Sep. 8, 1999 (JP) .................................. 11-254564

(51) Int. Cl.[7] .................................. H02M 7/12
(52) U.S. Cl. .................. 363/84; 363/86; 363/89; 323/239; 323/244
(58) Field of Search .................. 323/237, 239, 323/241, 244, 246; 363/84, 85, 86, 89, 125, 126

(56) References Cited

U.S. PATENT DOCUMENTS

| | | | |
|---|---|---|---|
| 3,372,326 | * 3/1968 | Stefanov | 363/89 |
| 3,373,337 | * 3/1968 | Hung | 363/86 |
| 3,375,428 | * 3/1968 | Mitchell | 363/86 |
| 3,470,444 | * 9/1969 | Bixby | 363/126 |
| 4,051,425 | * 9/1977 | Smith | 363/86 |
| 4,302,717 | * 11/1981 | Olla | 363/89 |
| 4,307,332 | * 12/1981 | Lorenzo et al. | 323/246 |
| 4,316,125 | * 2/1982 | Noguchi | 363/86 |
| 4,321,662 | * 3/1982 | Yokoyama | 323/237 |
| 4,665,476 | * 5/1987 | Masuda | 363/128 |
| 5,729,120 | * 3/1998 | Stich et al. | 323/239 |

FOREIGN PATENT DOCUMENTS

| | | |
|---|---|---|
| 0 875 983 | 11/1998 | (EP) . |
| 54-034507 | 10/1979 | (JP) . |
| 57-010821 | 1/1982 | (JP) . |
| 5-082146 | 11/1993 | (JP) . |
| 11-103541 | 4/1999 | (JP) . |

OTHER PUBLICATIONS

"Development of the IPD Series Standby–State Power Supply", Matsushita Electronic Industries Co., Ltd., an article in MEC News release in Nov. 1988, 3 pages.

Isao Shibasaki, et al., "A Magic Switch Thyristor: Application to 3.2 Amplifier Power Supply", Dec. 24, 1985, Ninth Publication on Apr. 10, 1993, pp. 138–139.

* cited by examiner

Primary Examiner—Jeffrey Sterrett
(74) Attorney, Agent, or Firm—Oblon, Spivak, McClelland, Maier & Neustadt, P.C.

(57) ABSTRACT

An output voltage of a rectification smoothing circuit is compared with a reference voltage. When a reduction in the output has been detected, an A/D converting circuit converts a result of the comparison which is negatively fed back by an output voltage feedback circuit to obtain a control signal for a bidirectional switch element inserted into a primary side of a transformer so as to turn ON or OFF synchronously or asynchronously with a commercial power supply via an intermittent control circuit.

28 Claims, 17 Drawing Sheets

| | WHEN BIDIRECTIONAL SWITCH IS OFF (Vee OF CONTROLLER IS ALWAYS AT THE SAME POTENTIAL AS-SIDE OF COMMERCIAL POWER SUPPLY) | WHEN BIDIRECTIONAL SWITCH IS ON (Vee OF CONTROLLER IS ALWAYS AT THE SAME POTENTIAL AS LOWER LINE OF COMMERCIAL POWER SUPPLY) |
|---|---|---|
| WHEN UPPER LINE OF INPUT VOLTAGE IS + | UPPER LINE→C1→D1→C3 (CHARGE)→D8→ LOWER LINE ↘D4→C2↗ | UPPER LINE→C1 (CHARGE)→D1→ C3 (CHARGE)→D8→ LOWER LINE ↘Q8→D8↗ |
| WHEN LOWER LINE OF INPUT VOLTAGE IS + | LOWER LINE→C2→D3→C3 (CHARGE)→D7→1a→ UPPER LINE ↘D2→C1↗ | LOWER LINE→Q8→D2→C1 (DISCHARGE) →UPPER LINE |

FIG. 3

|  | WHEN BIDIRECTIONAL SWITCH IS OFF (Vee OF CONTROLLER IS ALWAYS AT THE SAME POTENTIAL AS-SIDE OF COMMERCIAL POWER SUPPLY) | WHEN BIDIRECTIONAL SWITCH IS ON (Vee OF CONTROLLER IS ALWAYS AT THE SAME POTENTIAL AS LOWER LINE OF COMMERCIAL POWER SUPPLY) |
|---|---|---|
| WHEN UPPER LINE OF INPUT VOLTAGE IS + | UPPER LINE→C1 (CHARGE)→D8→ LOWER LINE ↘D4→C2↗ →D1→C3 | UPPER LINE→C1 (CHARGE)→D1→ C3 (CHARGE)→D8→ LOWER LINE |
| WHEN LOWER LINE OF INPUT VOLTAGE IS + | LOWER LINE→C2→D3→C3 (CHARGE)→D7→1a→UPPER LINE ↘D2→C1↗ | LOWER LINE→Q8→D2→C1 (DISCHARGE) →UPPER LINE |

FIG. 14

| MODE | OUTPUT VOLTAGE Out | Er2, VOLTAGE ACROSS THE RESISTOR R2 | comp1/2/3/4 OUTPUT | SET/RST/D INPUT | BIDIRECTIONAL SW |
|---|---|---|---|---|---|
| 1 | LOW | Er2<E1 | H/L/L/L | H/L/H | FORCIBLE ON |
| 2 | SLIGHTLY LOWER | E1<Er2/E1+E2 | L/L/L/L | L/L/H | SYNCHRONOUS ON |
| 3 | INTERMEDIATE | E1+E2<Er2<E1+E2+E3 | L/H/H/L | L/L/? | INCONSTANT HYSTERESIS AREA |
| 4 | SLIGHTLY HIGHER | E1+E2+E3<Er2<E1+E2+E3+E4 | L/H/L/L | L/L/L | SYNCHRONOUS OFF |
| 5 | HIGH | E1+E2+E3+E4<Er2 | L/H/L/H | L/H/L | FORCIBLE OFF |

FIG. 15

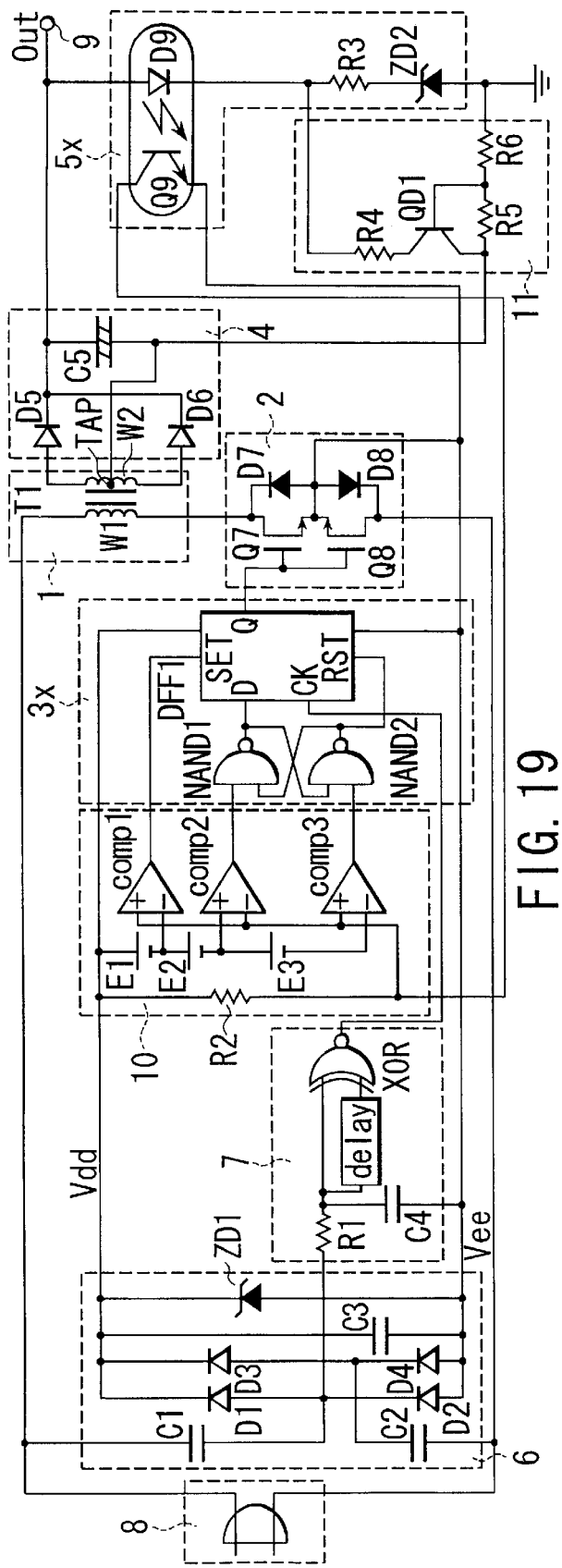
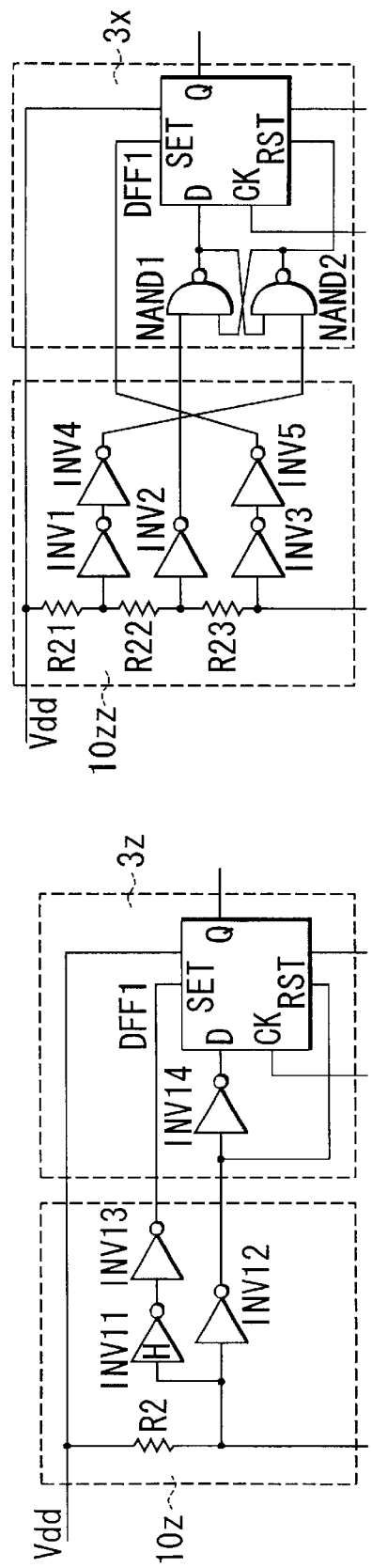
FIG. 19
FIG. 20B
FIG. 20A

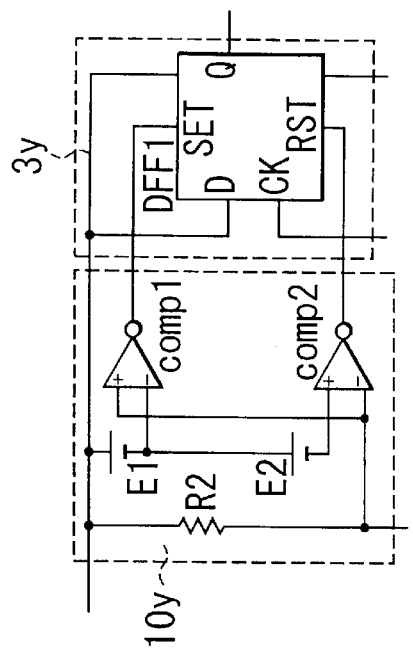
FIG. 22
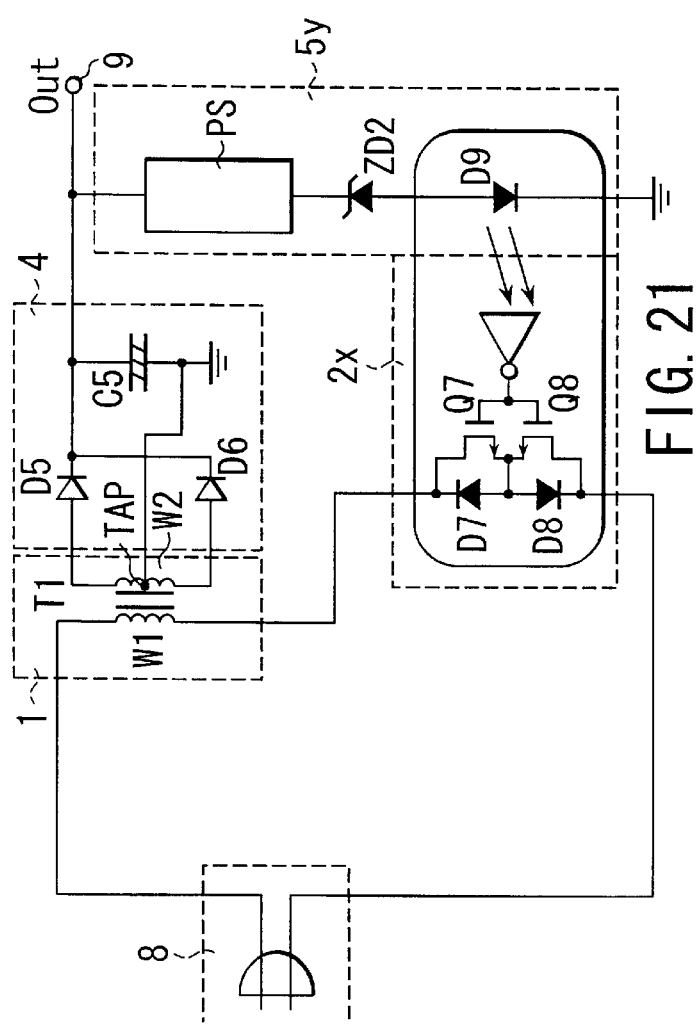
FIG. 21
| MODE | OUTPUT VOLTAGE Out | Er2, VOLTAGE ACROSS THE RESISTOR R2 | comp1/2 OUTPUT | SET/RST/D INPUT | OPERATION |
|---|---|---|---|---|---|
| 1 | LOW | 0<Er2<E1 | H/L | H/L/H | FORCIBLE ON |
| 2 | INTERMEDIATE | E1<Er2/E1+E2 | L/L | L/L/H | SYNCHRONOUS ON |
| 5 | HIGH | E1+E2<Er2 | L/H | L/H/H | FORCIBLE OFF |
FIG. 23

ENERGY EFFICIENT POWER SUPPLY WITH LIGHT-LOAD DETECTION

CROSS-REFERENCE TO RELATED APPLICATIONS

This application is based upon and claims the benefit of priority from the prior Japanese Patent Applications No. 11-183918, filed Jun. 29, 1999; and No. 11-254564, filed Sep. 8, 1999, the entire contents of which are incorporated herein by reference.

BACKGROUND OF THE INVENTION

The present invention relates to a power supply unit connected to a commercial frequency power supply for an electric and electronic apparatus such as a personal computer, a television, a VTR, etc. Particularly, the invention relates to an energy-saving type power supply unit capable of substantially reducing power consumption during a light-load period such as a standby period and also capable of having high efficiency during both a light-load operation and a rated-load operation.

A conventional power supply unit has been designed to have a maximum efficiency during a rated-load period. Therefore, the conventional power supply unit has a drawback in that the efficiency is lowered substantially during a light-load period such as a standby period. On the other hand, when the power supply unit is designed to have maximum efficiency during a light-load period, the output voltage is lowered and the efficiency is lowered substantially during a rated-load period. Thus, in this case, the conventional power supply unit also has had a drawback.

In the light of the above problems, there have been various trials to overcome such difficulties. As a first example, Jpn. Pat. Appln. KOKOKU Publication No. 5-82146 disclosed "A DC-DC converter" on Nov. 17, 1993. This application is for substantially improving the conversion efficiency during a light-load period by intermittently operating a switching converter during the light-load operation.

As a second example, Matsushita Electronic Industries Co., Ltd. disclosed an article on reserved power supply IPD series in its news release in November 1998. The article explains that it is possible to reduce switching loss by decreasing the number of switching during a light-load period. This conventional example improves the efficiency during the light-load operation by decreasing the number of switching or the number of oscillation during this period.

As a third example, there is disclosed in Jpn. Pat. Appln. KOKAI Publication No. 11-103541 a case for improving the efficiency during a light-load period by intermittently operating a transformer of a commercial frequency (50/60 Hz), as shown in FIG. 6.

As a fourth example, there is a publication of "A magic switch thyristor: application to 3.2 amplifier power supply" by Isao Shibasaki, Seibundo-Shinkousha, p. 139, issued on Dec. 24, 1985, ninth publication on Apr. 10, 1993. This discloses a technique for increasing output regulation and power efficiency by controlling the current conduction angle of TIAC that is inserted into the primary side of a power supply transformer of a power amplifier.

In the above first and second examples of known techniques, the efficiency during a light-load period is improved by employing an intermittent operation in the high-frequency switching regulator. In the third example, the efficiency is improved by intermittently operating the commercial frequency transformer during a light-load operation. In the fourth example, both regulation and efficiency are improved by controlling the conductive angle of a TRIAC for each cycle of commercial frequency.

However, according to the first and second examples, the handling of a high frequency involves unnecessary radiation of electromagnetic waves. According to the third example, the magnitude of unnecessary radiation of electromagnetic waves is small as the device handles a low frequency or a commercial frequency. However, as the power control is not steady because of a selective control of either an intermittent control or a continuous control, the regulation of an output voltage is not satisfactory. Therefore, there is such a problem that the output voltage increases during a light-load operation and the output voltage decreases during a rated-load operation. This makes it necessary to add a voltage stabilization device such as a three-terminal regulator to the secondary side of the transformer, which results in a complex construction.

According to the fourth example, an intermittent operation is not carried out as the conductive angle of each cycle is controlled. Therefore, there is no improvement in the efficiency during a super-light load operation like a standby period.

It is, therefore, an object of the present invention to provide an energy-saving type power supply unit capable of substantially reducing power consumption during a light-load period like a standby period and also having always high efficiency during both light-load and rated-load periods, in the power supply unit connected to a commercial frequency power supply for an electric/electronic apparatus such as a television, a VTR, etc.

BRIEF SUMMARY OF THE INVENTION

In order to achieve the above object, according to a first aspect of the invention, there is provided a power supply unit comprising: a transformer having a primary winding connected to an AC commercial power supply; a bidirectional switch unit connected in series between the primary winding and the AC commercial power supply; and an AC/DC converting circuit connected to a secondary winding of the transformer, wherein ON/OFF operation of the bidirectional switch unit is intermittently controlled according to an output of the AC/DC converting circuit and a cycle of the AC commercial power supply.

According to a second aspect of the invention, there is provided a power supply unit comprising: a transformer having a primary winding connected to an AC commercial power supply; a bidirectional switch unit connected in series between the primary winding and the AC commercial power supply; an AC/DC converting circuit connected to a secondary winding of the transformer; and a switch control circuit for controlling ON/OFF operation of the bidirectional switch unit according to an output voltage of the AC/DC converting circuit, wherein the switch control circuit converts the output voltage of the AC/DC converting circuit into a digital signal via an analog/digital converting circuit with a negative feedback of the converted signal, and controls the ON/OFF operation of the bidirectional switch unit based on at least three modes including a control mode of forcibly turning ON the bidirectional switch unit when the output voltage of the AC/DC converting circuit is lower than a predetermined value.

Based on the above-described constructions, it is possible to obtain high power-efficiency and satisfactory regulation of an output voltage according to a variation in the load over a wide range of operation period from a super-light load operation period to a rated-load operation period. Further, as the commercial frequency is used, it is possible to minimize unnecessary radiation of electromagnetic waves that are observed in high-frequency switching regulators.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram for explaining a current route for charging a capacitor of a control power supply circuit shown in FIG. 2.

FIG. 14 is a diagram for explaining a current route for charging a capacitor of a control power supply circuit in the embodiment shown in FIG. 13.

FIG. 15 is a diagram for explaining the operation of a four-value detection type system in the embodiment shown in FIG. 13.

FIG. 19 is a circuit diagram showing still another embodiment of the invention.

FIG. 20A is a diagram showing one method of achieving an A/D converting circuit.

FIG. 20B is a diagram showing another method of achieving an A/D converting circuit.

FIG. 21 is a circuit diagram showing still another embodiment of the invention.

FIG. 22 is a circuit diagram showing still another embodiment of the invention.

FIG. 23 is a diagram showing a relationship between an output voltage and a circuit operation in the embodiment shown in FIG. 19.

DETAILED DESCRIPTION OF THE INVENTION

Embodiments of the present invention will now be explained in detail.

Figure 1:
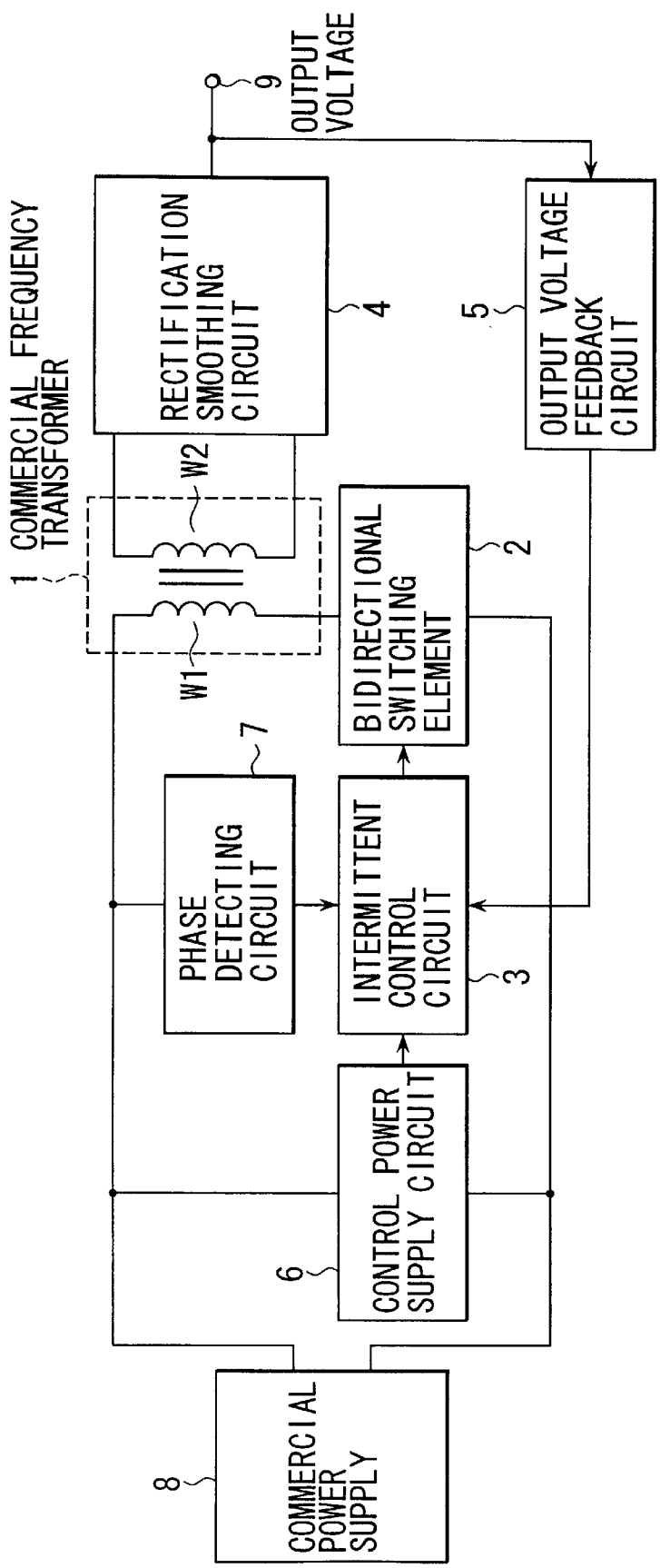
FIG. 1 is a block diagram for explaining the principle of the present invention.

FIG. 1 is a functional block diagram showing the basic principle of the present invention. First, the basic principle of the present invention will be explained with reference to FIG. 1.

Referring to FIG. 1, a primary winding W1 of a commercial frequency transformer 1 is connected in series with an AC commercial power supply 8 of, for example, 100 V and 50 Hz. A secondary winding W2 of the commercial frequency transformer 1 has a winding rate to enable a voltage of 100 V to fall to a few volts, for example. The dropped voltage is converted into a DC voltage by a rectification smoothing circuit 4 as an AC/DC converting circuit, and is then output from an output terminal 9.

A control input terminal of the bidirectional switch device 2 is connected to a control output terminal of an intermittent control circuit 3. The intermittent control circuit 3 is connected to receive an output signal of an output voltage feedback circuit 5 supplied with an output voltage from the output terminal 9 and to a detection signal of a phase detecting circuit 7. The intermittent control circuit 3 operates by receiving a supply of control power converted into a DC voltage from a control power supply circuit 6 that is connected to the commercial power supply 8. The whole units shown in FIG. 1 constitute the power supply unit of the present invention.

The operation of the circuit shown in FIG. 1 will be explained next. The commercial frequency transformer 1 is provided with the primary and secondary windings W1 and W2 to have a close connection to a core material of a compact EI silicon steel plate, that is, to have no leakage flux. A winding rate is determined based on a rate of a voltage of the used commercial power supply 8 to a necessary output voltage. The bidirectional switch device 2 carries out a bidirectional switching of an AC. For the bidirectional switch device 2, there is used a TRIAC, a pair of series high-withstanding voltage FETs common to the source, or a diode bridge plus a high withstanding voltage FET, according to the specifications of embodiments as described later in detail.

The intermittent control circuit 3 is mainly constructed of a logic circuit, and generates a signal for ON/OFF controlling the bidirectional switch device 2 at a timing synchronous with a predetermined phase of the commercial power supply 8 based on a timing signal from the phase detecting circuit 7. The rectification smoothing circuit 4 has a function of rectifying a voltage generated at a secondary side of the commercial frequency transformer 1 with the rectifying device or the like, and smoothing a generated pulsating current with a large-capacity capacitor. The output voltage feedback circuit 5 has a function of comparing the output voltage of the rectification smoothing circuit 4 with the reference voltage, providing a negative feedback of a difference voltage to the intermittent control circuit 3, and controlling the ON/OFF operation of the bidirectional switch device 2 together with the intermittent control circuit 3. For example, when the output voltage is lowered, the volume of feedback to the intermittent control circuit 3 decreases and the bidirectional switch device 2 has a higher rate of ON time. On the other hand, when the output voltage is increased, the volume of feedback to the intermittent control circuit 3 increases and the bidirectional switch device 2 has a higher rate of OFF time. However, the ON/OFF timing of the bidirectional switch device 2 by the intermittent control circuit 3 based on the negative feedback volume from the output voltage feedback circuit 5 is synchronous with a predetermined phase of the commercial power supply based on the timing signal from the phase detecting circuit 7 as described in detail later.

As explained above, the output voltage is held at almost a constant level regardless of variations in the load. Particularly, during a light-load operation, the current conduction time is short in the primary winding W1 of the commercial frequency transformer 1, and the quiescent time becomes longer. As a result, copper loss and iron loss of the transformer 1 are reduced, with improved power efficiency of the power supply system.

An embodiment of a construction based on the principle of the present invention shown in FIG. 1 will be explained in detail. Portions corresponding to those in FIG. 1 are attached with like reference numbers in the following drawings.

A Synchronous ON/OFF System

Figure 2:
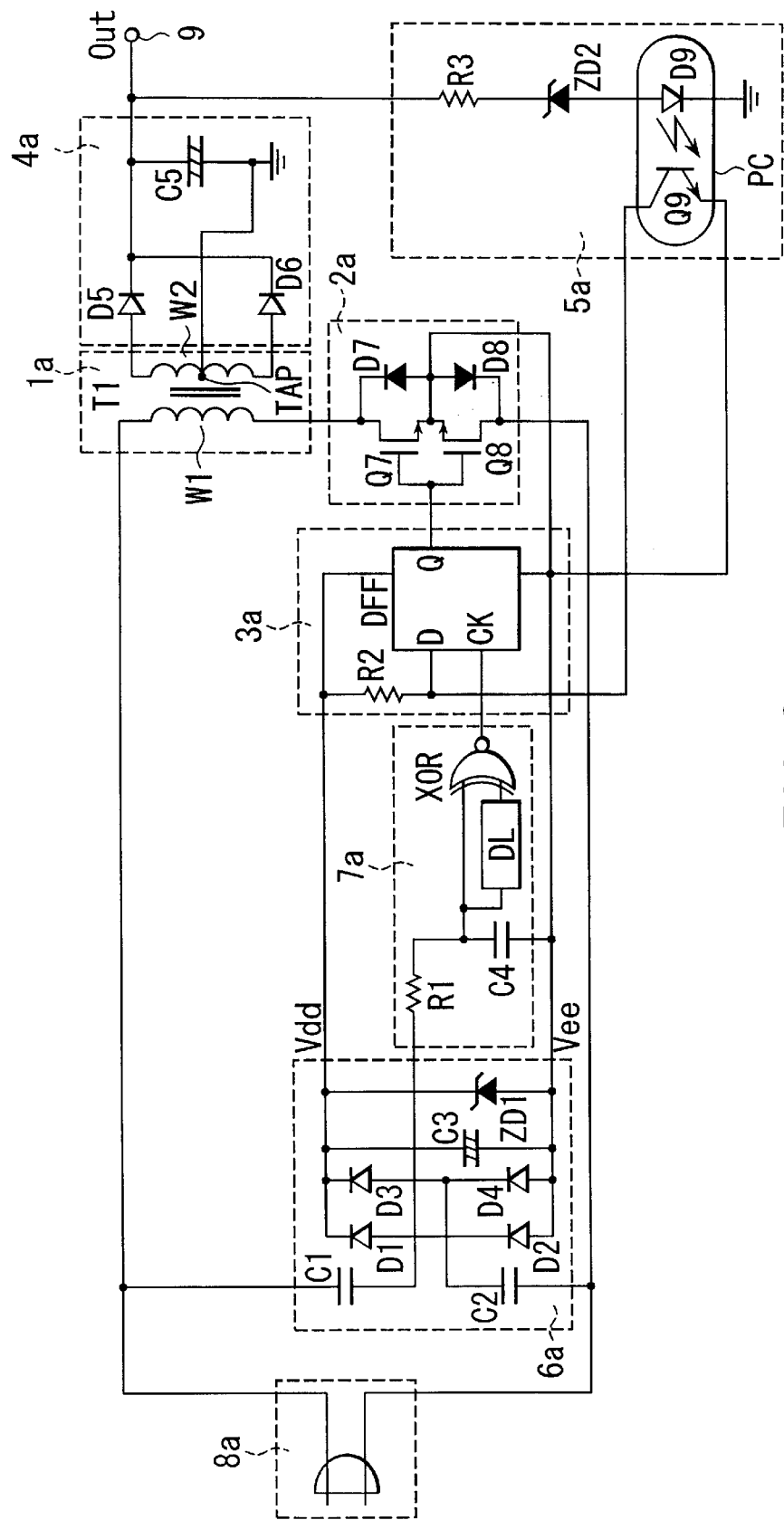
FIG. 2 is a circuit diagram showing one embodiment of the invention.

FIG. 2 shows an example of a circuit of a synchronous ON/OFF system that is constructed such that the ON/OFF control of a bidirectional switch 2a is carried out in synchronism with the phase of the commercial power supply 8. Blocks 1a to 8a in FIG. 2 correspond to blocks 1 to 8 in FIG. 1 respectively.

An intermediate tap TAP is provided at a secondary winding W2 of the commercial frequency transformer 1a. Both terminals of the secondary winding W2 are connected to one end of a large-capacity smoothing capacitor C5 through rectification diodes D5 and D6 within a rectification smoothing circuit 4a, and are also connected to an output terminal 9. The other end of the smoothing capacitor C5 is grounded together with the intermediate tap TAP.

The bidirectional switch 2a has two N-channel MOSFETs Q7 and Q8 connected in series, with a source in common, between a primary winding W1 of the transformer 1a and one terminal of a commercial power supply 8a. A gate is connected in common to a Q output terminal of an intermittent control circuit 3a. The diodes D7 and D8 are parasitic diodes, and are connected between a source and a drain of the N-channel MOSFETs Q7 and Q8 respectively. A source-common connected node of the N-channel MOSFETs Q7 and Q8 is connected to a negative (Vee) side output terminal of a power supply circuit 6a to be described later, together with a common-connected node of the parasitic diodes D7 and D8.

The intermittent control circuit 3a is constructed of an edge-trigger D flip-flop DFF and a pull-up resistor R2 of a D input terminal. A positive-side power supply terminal of the edge-trigger type D flip-flop DFF is connected to a positive (Vdd) side output terminal of the power supply circuit 6a together with the pull-up resistor R2. A negative-side power supply terminal is connected to the Vee terminal. A Q output terminal of the edge-trigger type D flip-flop DFF is connected to the gate-common connection point of the transistors Q7 and Q8 of the bidirectional switch 2a. A clock (CK) input terminal of the edge-trigger type D flip-flop DFF is connected to an output terminal of an exclusive OR circuit XOR that is an output terminal of a phase detecting circuit 7a to be described later.

An output voltage feedback circuit 5a consists of a Zener diode ZD2 for giving a reference voltage, a current control resistor R3 connected between the Zener diode ZD2 and the output terminal 9, a light-emitting diode D9 sealed integrally within a package as a photo-coupler PC and connected between the Zener ZD2 and the ground, and a light-receiving transistor Q9 optically connected with the light-emitting diode D9. A collector side of the light-receiving transistor Q9 is connected to the D terminal of the edge-trigger type D flip-flop DFF, and is also connected to the Vdd terminal via the resistor R2. An emitter side of the light-receiving transistor Q9 is connected to the Vee terminal.

The phase detecting circuit 7a consists of a combination of a resistor R1 and a capacitor C4 for constituting a low-pass filter, a delay element DL connected to a connection point between the resistor R1 and the capacitor C4, and the exclusive OR circuit XOR having a first input directly connected to the connection point between the resistor R1 and the capacitor C4 and a second input connected to an output side of the delay element DL. The other end of the capacitor C4 is connected to the Vee terminal. The other end of the resistor R1 is connected to one end of the commercial power supply 8 via the capacitor C1 in the control power supply circuit 6a.

The delay element DL used here is not a delay line, but has a desired delay time by having, for example, dozens of inverters connected in cascade. With this arrangement, it is possible to easily construct a delay element having a desired delay time within a chip.

The construction of the control power supply circuit 6a for supplying DC operation power to a control section such as the intermittent control circuit 3a will be explained last. The control power supply circuit 6a consists of diodes D1 and D2 connected in series, a capacitor C1 connected to a connection point between the diodes D1 and D2 and to one (upper side) line of the commercial power supply 8a, diodes D3 and D4 connected in series, a capacitor C2 connected to a connection point between the diodes D3 and D4 and to the other (lower side) line of the commercial power supply 8a, a large-capacity smoothing capacitor C3 connected in parallel with the series-connected diodes D1 and D2 and D3 and D4, and a Zener diode ZD1 connected in parallel with the capacitor C3.

A DC voltage including a ripple component obtained by the diodes D1 to D4 is smoothed by the capacitor C3. A stable DC output restricted to within a range of predetermined values (Vdd, Vee) by the Zener diode ZD1 is obtained.

The operation of the embodiment shown in FIG. 2 will be explained. FIG. 2 shows the embodiment that realizes the basic block shown in FIG. 1 in a practical circuit. The control power supply circuit 6a has a function of supplying operation power to a primary side control section of the transformer 1a consisting of the intermittent control circuit 3a and the phase detecting circuit 7a.

Assume that there is no bidirectional switch 2a. When a positive current has flown through to the upper line of the commercial power supply 8a, the current flows to the capacitor C3 from the capacitor C1 via the diode D1. The current then charges the capacitor C3 with a positive voltage applied to the Vdd side and a negative voltage applied to the Vee side. On the other hand, when a positive current has flown through the lower line of the commercial power supply 8a, the current flows to the capacitor C3 from the capacitor C2 via the diode D3. The current then charges the capacitor C3 with a positive voltage applied to the Vdd side and a negative voltage applied to the Vee side as well. As explained above, charge and discharge currents flow to the capacitors C1 and C2 according to a change in the amplitude of 50 Hz or 60 Hz of the commercial power supply 8a, thereby charging the capacitor C3. The voltage of the capacitor C3 is controlled by the Zener diode ZD1 so as not to have an excess voltage.

In actual practice, the power supply circuit 6a is connected in parallel with a series circuit of the primary winding W1 of the transformer 1a and the bidirectional switch 2a. Therefore, the route through which an electric charge is supplied to the capacitor C3 changes depending on the ON/OFF state f the bidirectional switch 2a and the polarity of the input commercial power supply 8a. FIG. 3 shows the whole states.

When the bidirectional switch 2a is ON, the Vee terminal as the —power supply of the control section is connected to the lower line of the commercial power supply 8a via the transistor Q8. Therefore, without exception, this Vee terminal has a potential at the —side of the polarity of the input commercial power supply 8a. As a result, no current flows to the capacitor C2, and the capacitor C2 does not operate, as can be understood from FIG. 3.

On the other hand, when the bidirectional switch 2a is in the OFF state, there is no current route for charging and discharging unless there is the capacitor C2. Therefore, the capacitor C2 is essential in the example using the bidirectional switch 2a as shown in FIG. 2. Accordingly, both capacitors C1 and C2 are necessary as reactance droppers in the presence of both the ON mode and the OFF mode of the bidirectional switch 2a.

The intermittent control circuit 3a consists of the edge-trigger type D flip-flop, and the output Q changes based on only the rising edge of the clock pulse from the phase detecting circuit 7a input to a CK terminal. When this output Q has risen, both transistors Q7 and Q8 of the bidirectional switch 2a are turned ON. Therefore, the change in the output of the output voltage feedback circuit 5a is transmitted to the output at the edge timing of the rising of the clock. When the output voltage of the rectification smoothing circuit 4a has exceeded a predetermined reference voltage (that is equal to the sum of a voltage of the Zener diode D2 and a forward voltage of the light-emitting diode D9 within the photo-coupler PC), the bidirectional switch 2a is turned OFF at the above timing. On the other hand, when the output voltage has lowered to less than the reference voltage, the bidirectional switch 2a is turned ON at the above timing. In other words, the output voltage Out of the rectification smoothing circuit 4a is controlled to become almost the reference voltage.

In the embodiment of FIG. 2, it is important that the rising timing of the clock coincides with a peak value of a commercial power supply input voltage waveform, for the following reason. As the phase detection is taken from the connection point between the capacitor C1 and the diode D1, the current phase of this connection point is advanced by 90 degrees from the input voltage waveform. A zero-cross point of this connection point corresponds to a peak position of the input voltage waveform. A differential value of the voltage waveform becomes near zero, which is the timing when the primary side of the commercial frequency transformer 1a is turned ON. This timing is preferable in that a rush current to the inductance by the transformer 1a becomes small.

The resistor R1 and the capacitor C4 in the phase detecting circuit 7a form a low-pass filter for removing input noise. The delay element DL consists of a delay circuit, and this determines a pulse width of the clock pulse that is input to the CK terminal of the D flip-flop DFF.

Figure 4:
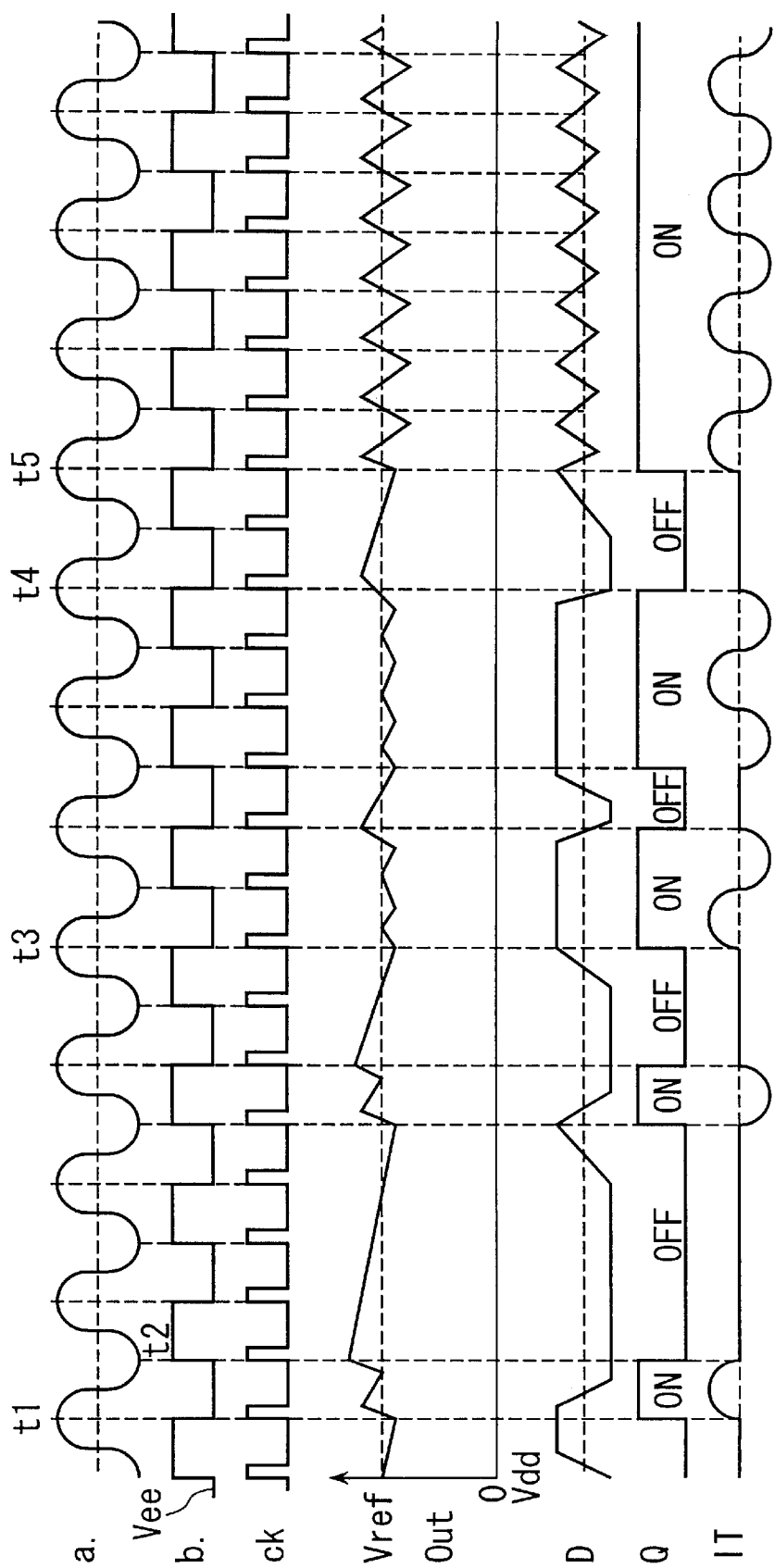
FIG. 4 is a time chart showing the operation of the embodiment shown in FIG. 2.

FIG. 4 shows a timing chart of this circuit. The operation of the embodiment shown in FIG. 2 will be explained with reference to FIG. 4. In FIG. 4, a waveform a shows a voltage waveform of the commercial power supply 8a based on the lower line, and a waveform b shows an input voltage waveform of the phase detecting circuit 7a based on the Vee. CK shows a clock input waveform of the D flip-flop DFF within the intermittent control circuit 3a based on the Vee. A waveform Out shows an output voltage waveform of the rectification smoothing circuit 4a based on the ground potential, with a ground potential 0 and a specific reference voltage Vref shown at the same time. A waveform D shows an input waveform of a data input D of the D flip-flop DFF, with "H" and "L" threshold voltages shown by broken lines. A waveform Q shows a waveform of the output Q of the D flip-flop DFF. A waveform IT shows a current waveform of the current flowing through the commercial frequency transformer 1a. A horizontal axis represents a time axis. The timing chart starts with an intermittent operation during a light-load period, and ends with an operation under a continuous current conduction.

In other words, at a positive peak time t1 of the input voltage a from the commercial power supply 8a, the voltage Vee is directly supplied to one input of the exclusive OR circuit XOR from the connection point between the resistor R1 and the capacitor C4 of the phase detecting circuit 7a. Accordingly, the output clock CK of the exclusive OR circuit XOR rises.

In this case, the output Out of the rectification smoothing circuit 4a is at a lower level than the reference voltage Vref set by the Zener diode ZD2 and the diode D9. Therefore, the current flowing through the light-emitting diode D9 is cut off to stop the light emission. Thus, no current flows through the transistor Q9 within the photo-coupler PC, and a voltage of the Vdd is applied to the D terminal of the D flip-flop DFF. As the clock CK rises in this state, the Q output is set to ON and the current IT flows through the primary winding W1 of the transformer 1a.

The output voltage Out of the rectification smoothing circuit 4a increases based on the current IT. As a result, the light-emitting diode D9 starts light emission, a current flows through the transistor Q9, and the potential of the D terminal is lowered. As there is a reduction in the power supply voltage, the voltage Out is once lowered by a predetermined value at a level above the reference voltage Vref, and is then lowered to the Vref. During this period, the D input is lowered to the Vee. However, as the Q output still remains ON, the output voltage Out increases again.

When the power supply waveform a has become the peak value of the lower limit at a time t2, the next clock CK is generated. At this time, the output voltage Out is higher than the Vref by a predetermined value. Therefore, the D input remains at the lowered level of the Vee, and the Q output becomes OFF at the peak point of the lower limit. The bidirectional switch 2a is turned OFF, and no current flows to the transformer 1a. When the terminal 9 is not being connected with the load or when the terminal 9 is in a super-light load state, the charge of the capacitor C5 is gradually discharged and the voltage Out of the terminal 9 becomes closer to the Vref. Thus, the bidirectional switch 2a is turned ON and OFF in synchronism with the cycle of the power supply 8a.

As explained above, the D input increases to the Vdd when the output voltage Out becomes less than the reference voltage Vref. When the load is relatively small like the load during the period from a time t3 to a time t4, the voltage recovers soon when the voltage is less than the Vref. Therefore, the D input is held at almost the Vdd level. During this period, the Q output becomes ON, and the transformer 1a is connected to the power supply 8a relatively frequently.

When a high load has been connected to the output terminal 9, the D input becomes the Vdd level at a time t5. Even when the output voltage Out increases in excess of the Vref, the output voltage Out is lowered immediately after a charging to the capacitor C5 has been stopped. Thus, the D input increases, and the charging to the capacitor C5 is started again soon. As a result, the power supply 8a is continuously connected 761 to the transformer 1a in synchronism with the cycle of the power supply 8a after a time t5 shown in FIG. 4.

As explained above, according to the embodiment shown in FIG. 2, the ON/OFF timing of the bidirectional switch 2a is fixed to the timing of the peak of the power supply voltage. Therefore, noise does not occur easily by the switching, and there is small interference of unnecessary radiation. Particularly, as a differential value is zero at the peak timing of the input voltage, this is convenient as this peak point corresponds to a zero-cross of the current in the case of the inductance load of the transformer or the like.

A Synchronous ON and Asynchronous OFF System

Figure 5:
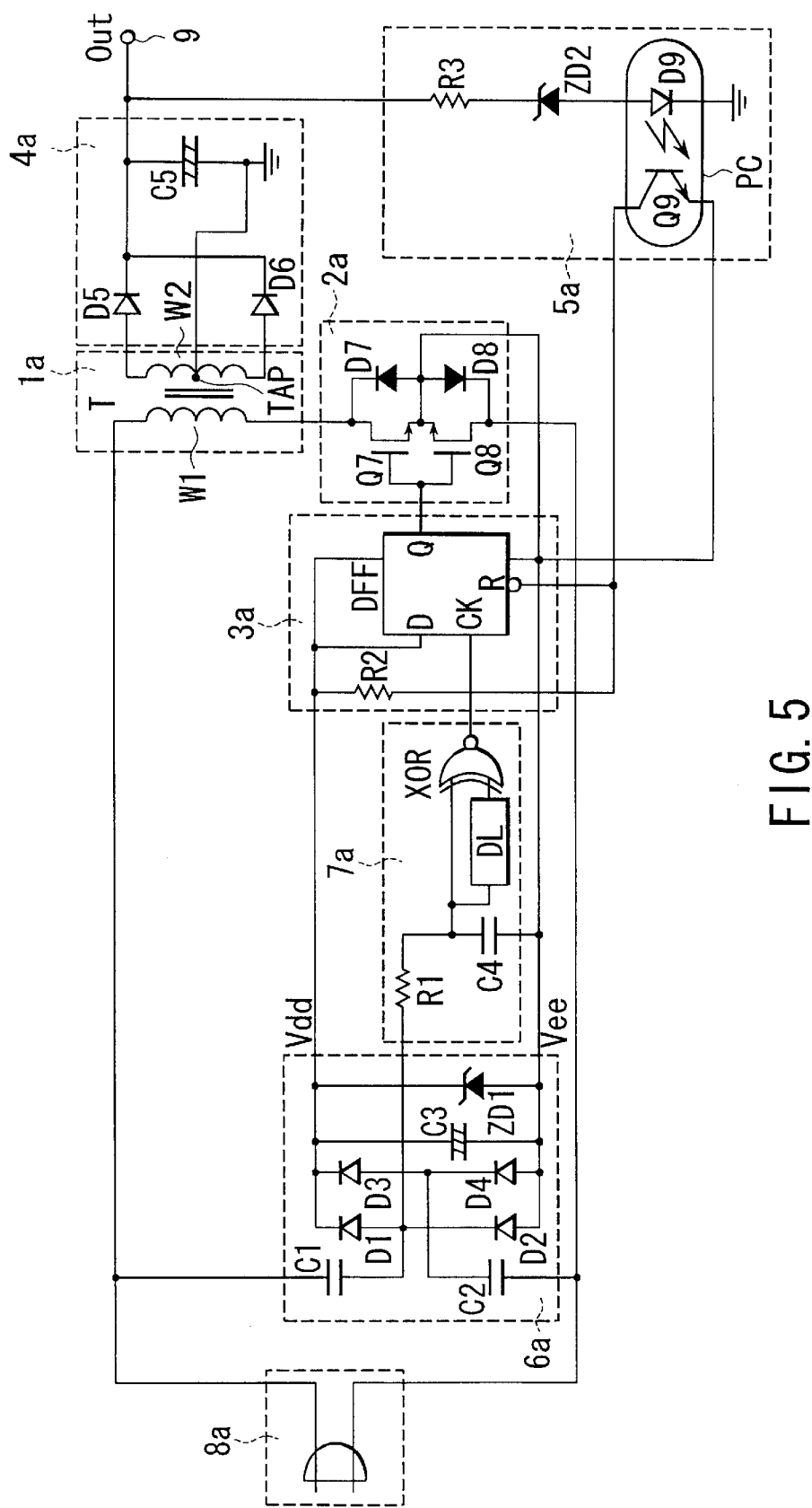
FIG. 5 is a circuit diagram showing another embodiment of the present invention.

FIG. 5 shows a circuit diagram of a synchronous ON and asynchronous OFF system as another embodiment of the present invention. In FIG. 5, portions corresponding to those in FIG. 2 are attached with like reference numbers and their detailed explanation will be omitted. The circuit of FIG. 5 is different from that of FIG. 2 in that a D input of a D flip-flop DFF of an intermittent control circuit 3b is connected directly to a +power supply Vdd, and that a signal of a connection point between an output voltage feedback circuit 5a and a pull-up resistor R2 is input to a reset terminal (L active) of the D flip-flop DFF (indicated by a thick line).

With the above alternation, when an output voltage Out of a rectification smoothing circuit 4a has exceeded a reference voltage Vref, it is possible to forcibly reset the D flip-flop DFF at any optional timing, that is, asynchronously. In other words, a timing for turning OFF a bidirectional switch 2a is also optional.

When Out >Vref, a current flowing through a transistor Q9 of a photo-coupler PC becomes larger. When the voltage of a resistor R2 has dropped to reach a reset voltage, the D flip-flop DFF is reset. Therefore, by suitably selecting a value of the resistor R2, it is possible to turn OFF the bidirectional switch 2a at an optional timing.

On the other hand, the bidirectional switch 2a is turned ON when a reset terminal is "H" and also when a clock input CK is at a rising timing. In other words, the timing of turning ON the bidirectional switch 2a is synchronous, and the timing of turning OFF the bidirectional switch 2a is asynchronous (optional).

As explained above, in the present embodiment, the timing when the primary side of a transformer 1a becomes OFF is optional (asynchronous). Therefore, the commercial frequency transformer 1a does not become conductive more than is necessary. It has been confirmed by experiment that the most excellent efficiency characteristics have been obtained during a light-load operation among embodiments explained.

An Asynchronous ON and Synchronous OFF System

An embodiment of an asynchronous ON and synchronous OFF system will be explained with reference to FIG. 6. The system of this embodiment has a similar construction to that of the embodiment shown in FIG. 2 except in the construction of an intermittent control circuit 3c. According to the intermittent control circuit 3c, a D input of a D flip-flop DFF is directly connected to a −power supply terminal Vee. A signal at a connection point between an output of an output voltage feedback circuit 5a and a pull-up resistor R2 is input to a set terminal (H active) of the D flip-flop DFF.

Figure 6:
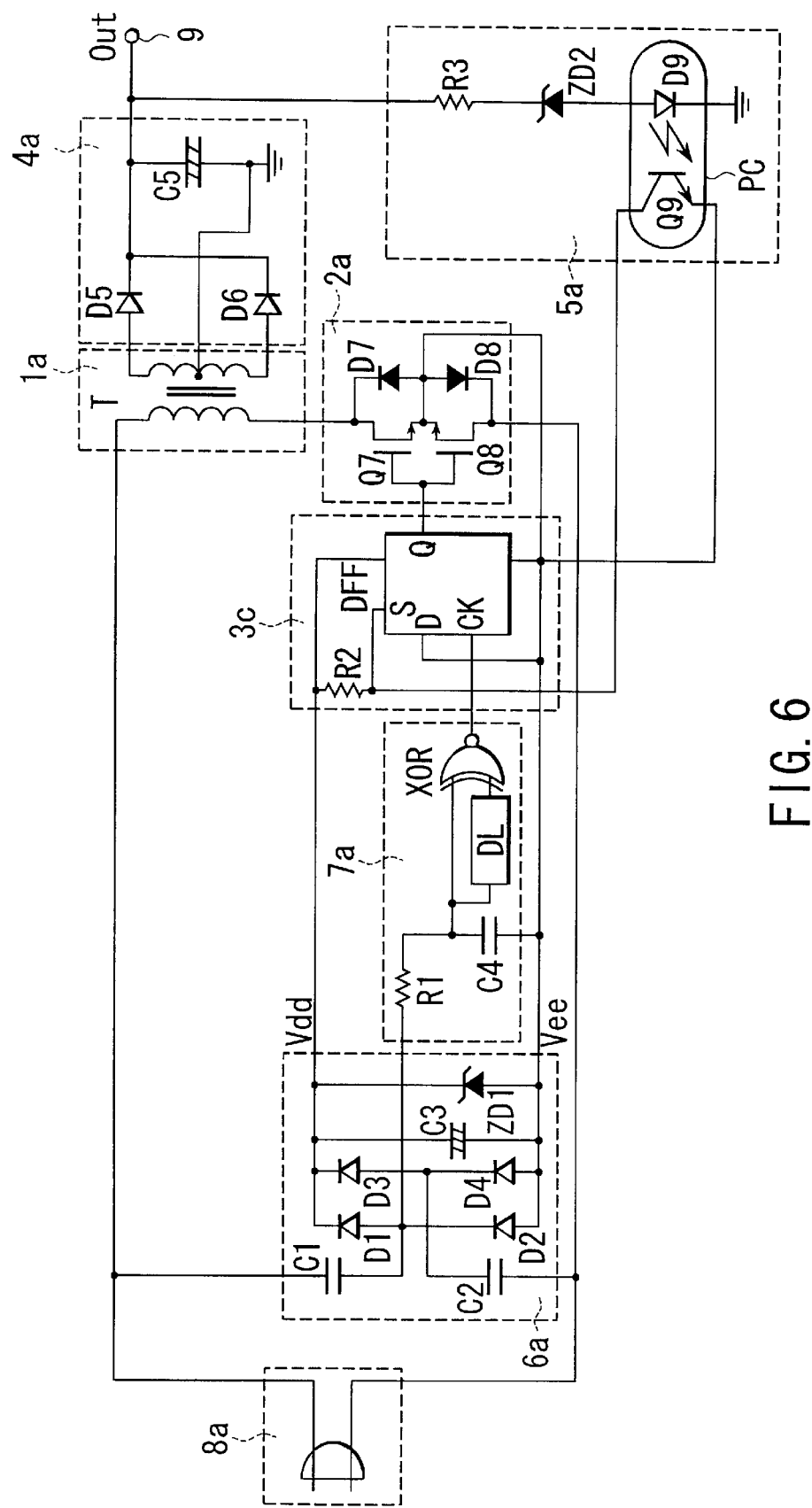
FIG. 6 is a circuit diagram showing still another embodiment of the invention.

With the above construction shown in FIG. 6, when an output voltage Out of a rectification smoothing circuit 4a is less than a reference voltage Vref, a volume of feedback to the output voltage feedback circuit 5a decreases, and there is small voltage drop in the resistor R2. A set signal of an "H" level is supplied from the resistor R2 to a set terminal S of the D flip-fop DFF and is set. The output voltage Out becomes less than the reference voltage Vref at a non-specified timing that is determined by the size of a load, for example. In other words, the D flip-flop DFF is forcibly set at any optional asynchronous timing to turn ON a bidirectional switch 2a. On the other hand, the bidirectional switch 2a is turned OFF when the set terminal S is "L" and also when a clock input CK is at a rising timing. In other words, the timing of turning OFF the bidirectional switch 2a is synchronous, and the timing of turning ON the bidirectional switch 2a is asynchronous.

As compared with the synchronous ON and asynchronous OFF system shown in FIG. 5, the system of the present embodiment shown in FIG. 6 has the OFF at an asynchronous timing. Therefore, there is small occurrence of a flyback voltage due to a leakage inductance from a primary winding WI of a transformer 1a. As a result, there is small generation of high-frequency noise.

A Pseudo-synchronous OFF System

Figure 7:
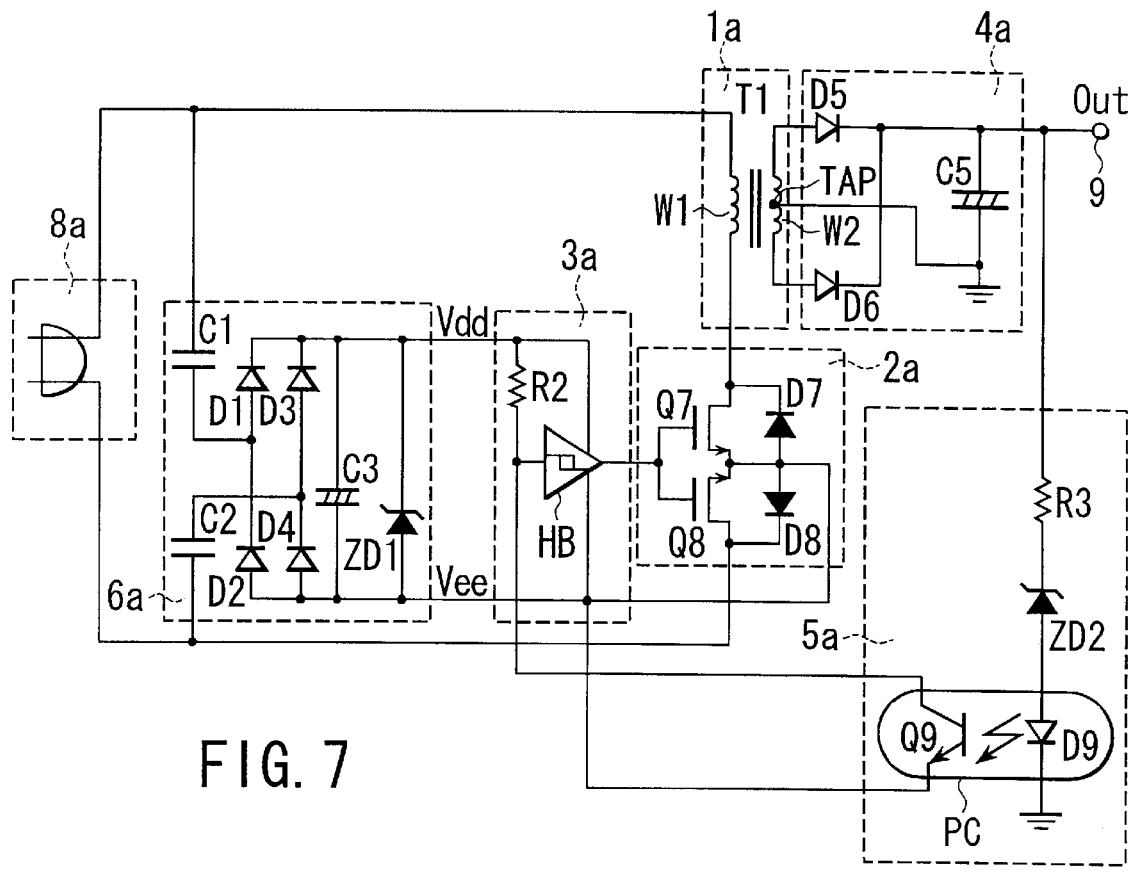
FIG. 7 is a circuit diagram showing still another embodiment of the invention.

FIG. 7 shows a circuit diagram of a pseudo-synchronous OFF system as still another embodiment of the present invention. The system of this embodiment has a similar construction to that of the embodiment shown in FIG. 2 except that the phase detecting circuit 7a used in FIG. 2 is deleted, and that an intermittent control circuit 3d has a different construction. The intermittent control circuit 3d does not use the D flip-flop DFF that is used in the embodiment shown in FIG. 2. The intermittent control circuit 3d consists of a hysteresis buffer HB and a pull-up resistor R2 connected between an input end of the hysteresis buffer HB and a power supply Vdd. Instead of the hysteresis, a normal buffer may be used.

In the present embodiment, as the phase detecting circuit for a power supply 8a is not used, both ON and OFF operations of a bidirectional switch 2a are carried out asynchronously. Based on the construction shown in FIG. 7, when an output voltage Out of a rectification smoothing circuit 4a is less than a reference voltage Vref, an output of an output voltage feedback circuit 5a becomes "H", and the bidirectional switch 2a is forcibly turned ON via the buffer HB.

On the other hand, when the output voltage Out of the rectification smoothing circuit 4a exceeds the reference voltage Vref, the output of the output voltage feedback circuit 5a becomes "L" and the bidirectional switch 2a is forcibly turned OFF.

A ripple component synchronous with the cycle of a normal commercial power supply 8a is superimposed on the output voltage waveform of the rectification smoothing circuit 4a.

There is a high probability that the bidirectional switch 2a is turned OFF at a maximum point of the output voltage Out, that is, at a point near a peak point of the ripple. This ripple is similar to an input voltage waveform applied to a primary winding W1 of a commercial frequency transformer 1a. There is a high probability that the bidirectional switch 2a is turned OFF at a point near a peak of the input voltage waveform.

Although the phase detecting circuit 7a is omitted from the present embodiment, when a certain level of an output ripple remains in the rectification smoothing circuit 4a, it is possible to artificially synchronize the OFF timing of the bidirectional switch 2a with the input by positively utilizing the ripple.

According to the present embodiment, the power efficiency is lost to some extent as the ON/OFF timings are slightly vague. However, as it is not particularly necessary to provide a phase detecting circuit for synchronizing with the input voltage waveform, it is possible to have a very simple circuit construction at low cost. Further, as there is a high probability that the OFF timing is approximately close to a zero-cross point, the occurrence of a flyback voltage due to the leakage inductance of the primary winding of the transformer 1a is small. As a result, there is small generation of high-frequency noise.

Figure 8:
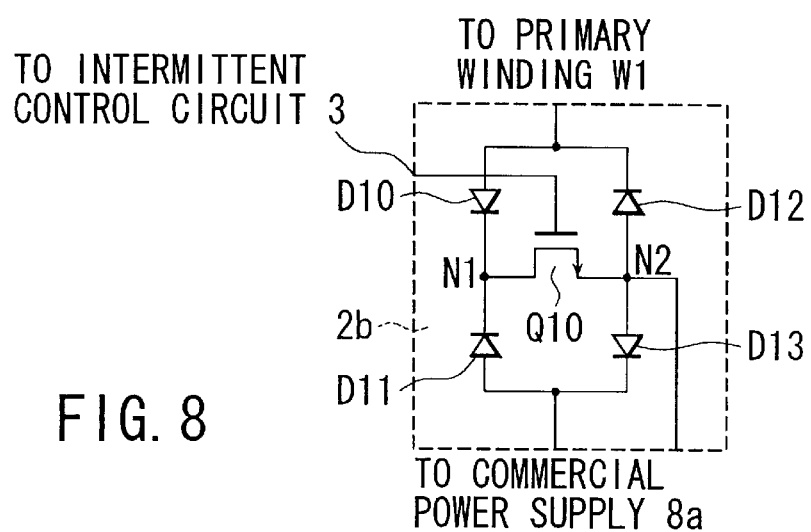
FIG. 8 is a circuit diagram showing another example of a bidirectional switch.

In the above-described embodiments shown in FIG. 2 to FIG. 7, the transistors Q7 and Q8 and the diodes D7 and D8 are used to construct the bidirectional switch 2a. However, as shown in FIG. 8, it is also possible to use a bidirectional switch 2b constructed of a diode bridge made up of four diodes D10, D11, D12 and D13, and a transistor Q10 connected between a connection node N1 of the diodes D10 and D11 and a connection node N12 of the diode D12 and D13. For the transistor Q10, it is also possible to use a bipolar transistor instead of a FET shown.

According to the circuit shown in FIG. 8, when a control signal of "H" has been supplied from an intermittent control circuit 3, the transistor Q10 is turned ON. A positive half-wave current of a power supply 8a flows through the diode D10, the transistor Q10 and the diode D13, and a negative half-wave current flows through the diode D11, the transistor Q10 and the diode D12.

An Asynchronous ON and Synchronous OFF System Using a Thyristor

Next, an asynchronous ON and synchronous OFF system using a thyristor and a diode bridge as a bidirectional switch as still another embodiment of the present invention will be explained with reference to FIG. 9. In the present embodiment, an impedance element Z2 is used as an intermittent control circuit 3e. Only a resistor element or a series-connected circuit of a capacitor and a resistor element can be used optionally for the impedance element Z2. Accordingly, the power supply circuit 6 and the phase detecting circuit 7 as explained in the preceding embodiments are not necessary.

A circuit of a diode bridge consisting of diodes D10 to D13 and a thyristor TH1 instead of the transistor Q10 in FIG. 8 is used for a bidirectional switch 2c.

Figure 9:
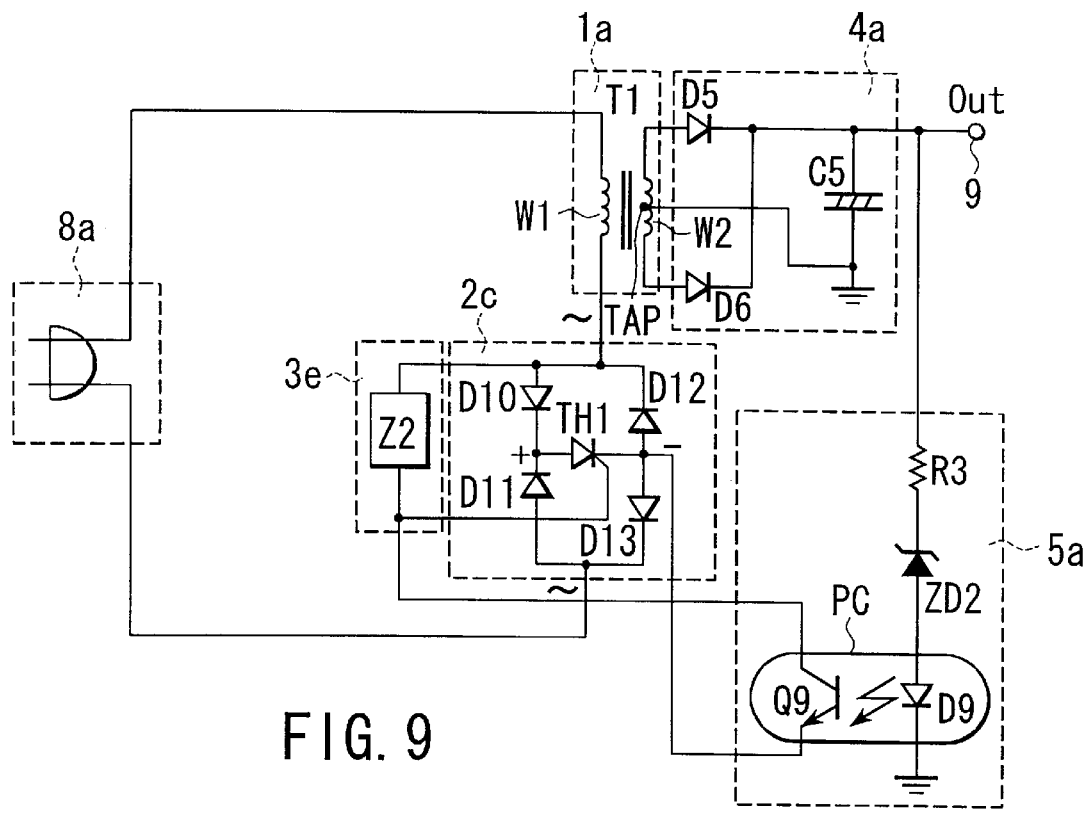
FIG. 9 is a circuit diagram showing still another embodiment of the invention.

In the embodiment shown in FIG. 9, the lower end of a primary winding W1 is connected to one end of a commercial power supply 8a via the impedance element Z2, a transistor Q9 and the diode D13. When an output voltage of a rectification smoothing circuit 4a is less than a reference voltage Vref, a light-emitting diode D9 within a photo-coupler PC of an output voltage feedback circuit 5a is not turned ON. An output of a feedback circuit 5a is released, and a gate current of the thyristor TH1 is supplied via the impedance element Z2 to turn ON the thyristor TH1. The thyristor TH1 can be turned ON at an optional timing when the gate voltage of the thyristor TH1 becomes equal to or above a threshold value. When the gate voltage is less than the threshold value, the thyristor TH1 cannot be turned ON at a timing near a zero-cross point of an input voltage of a power supply 8a when the impedance element Z2 consists of only the resistor element. When a reactance component of a capacitor is ruling as the impedance of the impedance element Z2, the timing when the thyristor TH1 cannot be turned ON is deviated by 90 degrees, and is near a peak value of the input voltage of the power supply 8a. In any case, as the range of time when the thyristor TH1 cannot be turned ON is narrow, it is practically possible to turn ON the thyristor TH1 at an optional timing. In other words, the system is asynchronous ON type.

On the other hand, when an output voltage Out of the rectification smoothing circuit 4a exceeds the reference voltage Vref, the output of an output voltage feedback circuit 5a is short-circuited and the gate current of the thyristor TH1 becomes zero. However, by the latch operation of the thyristor TH1, the ON state is maintained until the thyristor current becomes zero. This means that the thyristor TH1 is turned OFF in synchronism with the zero-cross point of the current. Thus, the system is synchronous OFF type. In other words, although a phase detecting circuit is not particularly used in the present embodiment, the system is functionally "asynchronous ON and synchronous OFF type".

In the present embodiment, it takes long for the ON-state thyristor TH1 to be tuned OFF. Therefore, power efficiency during the light-load operation is slightly poor. However, it is possible to achieve a low-cost power supply unit in a very simple structure with small number of elements. Further, as the OFF timing is the zero-cross point of the current, there is small occurrence of a flyback voltage due to a leakage inductance from the primary winding W1 of a transformer 1a. As a result, there is small generation of high-frequency noise.

An Asynchronous ON and Synchronous OFF System Using an Optical TRIAC

Next, an asynchronous ON and synchronous OFF system using an optical TRIAC as a bidirectional switch as still another embodiment of the present invention will be explained with reference to FIG. 10. As compared with the embodiment shown in FIG. 2, the present embodiment does not require the control power supply circuit 6a, the phase detecting circuit 7a and the intermittent control circuit 3a. However, as described later, a bidirectional switch 9f can achieve a function equivalent to that of the embodiment shown in FIG. 2.

A TRIAC module 10f is sealed within the same package, and is constructed of a light-emitting diode D9 and a bidirectional switch 9f. The bidirectional switch 9f consists of an optical TRIAC main body PT disposed to receive a light from the light-emitting diode D9, a stored impedance Z, and a zero-cross circuit ZC.

Figure 10:
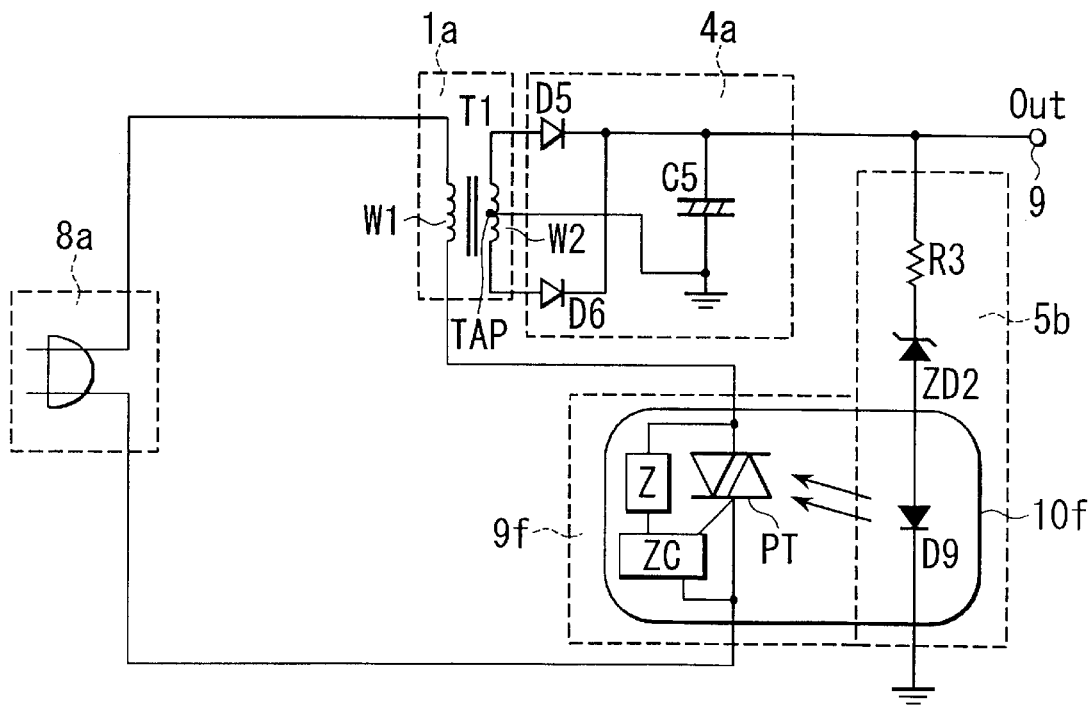
FIG. 10 is a circuit diagram showing still another embodiment of the invention.

In the circuit shown in FIG. 10, when an output voltage Out is lowered to become less than a reference voltage Vref, the light-emitting diode D9 is turned OFF. When the light-emitting diode D9 stops light emission, the optical TRIAC main body PT is turned ON. This operation is opposite to that of a normal optical TRIAC.

The function of the circuit shown in FIG. 10 is almost equivalent to that of the "asynchronous ON and synchronous OFF system utilizing a thyristor" shown in FIG. 9. In the present embodiment, when the output voltage Out of a rectification smoothing circuit 4a is less than the reference voltage Vref, the light-emitting diode D9 of an output voltage feedback circuit 5b is not turned ON, and the TRIAC main body PT is turned ON. The TRIAC main body PT is turned ON at an optional timing when a voltage applied to the TRIAC main body PT is at or above a predetermined value. In other words, the TRIAC main body PT can be turned ON at almost an optional timing. In other words, the system is asynchronous ON type.

On the other hand, when the output voltage Out of the rectification smoothing circuit 4a exceeds the reference voltage Vref, the light-emitting diode D9 within the output voltage feedback circuit 5b is turned ON, and the trigger current of the TRIAC main body PT becomes zero. However, by the latch operation of the TRIAC, the ON state is maintained until the thyristor current becomes lower than the held current. This means that the TRIAC is turned OFF in synchronism with almost the zero-cross point of the current. Thus, the system is synchronous OFF type. In other words, although a phase detecting circuit is not particularly used in the present embodiment, the system is functionally "asynchronous ON and synchronous OFF type".

In the present embodiment, the efficiency during the light-load operation is also slightly poor. However, it is possible to achieve a low-cost power supply unit in a very simple structure with small number of elements. Further, as the OFF timing is the zero-cross point of the current, there is small occurrence of a flyback voltage due to a leakage inductance from a primary winding W1 of a transformer 1a. As a result, there is small generation of high-frequency noise.

Figure 11A:
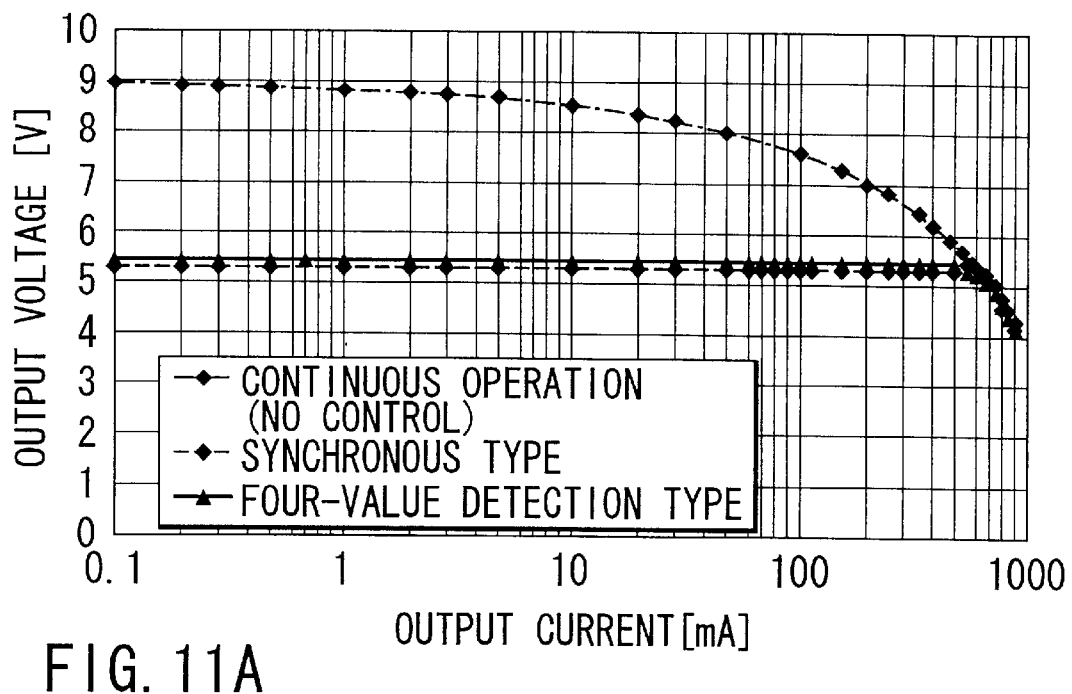
FIG. 11A and FIG. 11B are graphs showing output voltage characteristics and power efficiency characteristics of a prior-art technique and the present invention respectively.
Figure 11B:
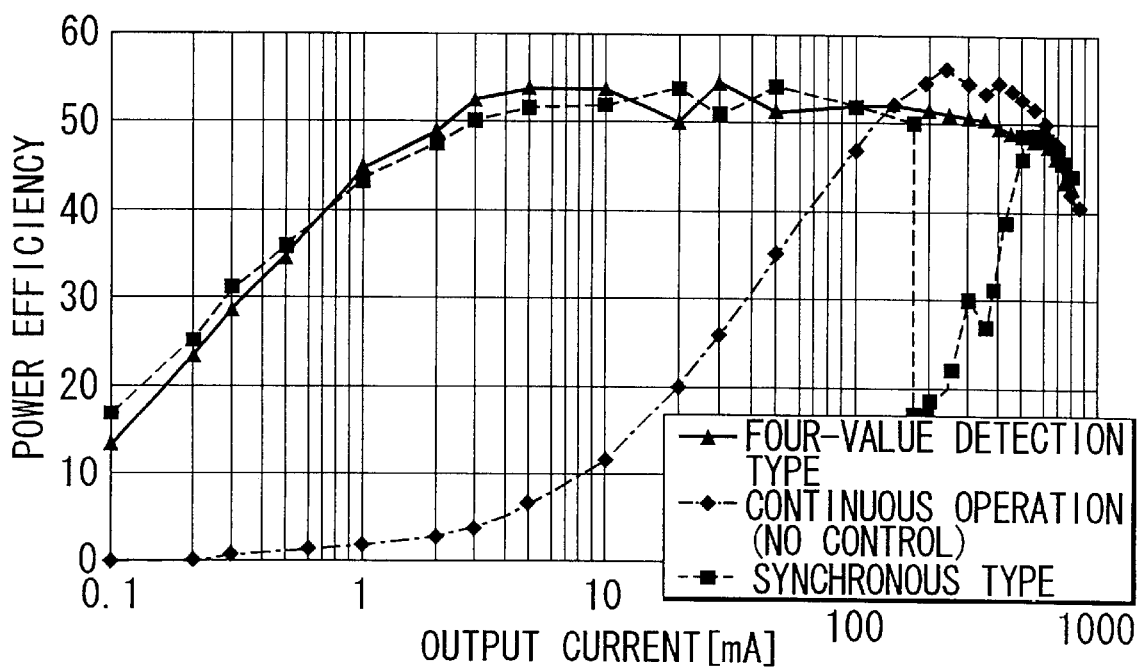

According to the power supply system of the embodiment shown in FIG. 2, the stability of an output voltage V in the case of the synchronous type is substantially improved from that of continuous current conduction (no control) as shown in FIG. 11A. However, as shown in FIG. 11B, power efficiency is substantially lowered during a rated-load operation although the efficiency is satisfactory during a light-load and intermediate-load operation. Therefore, it has been difficult to achieve stable power efficiency during a light-load to rated-load operation period. In other words, as shown in FIG. 11B, the synchronous system of the embodiment shown in FIG. 2 has generally a large effect of improved efficiency during a light-load operation. However, power efficiency is substantially lowered during an intermediate-load to high-load operation period as shown by broken lines.

On the other hand, the pseudo-synchronous system shown in FIG. 7 has a problem in that the effect of efficiency improvement is small during a light-load operation although there is little reduction in the efficiency during an intermediate-load to high-load operation.

According to an embodiment of the present invention to be described next, it is possible to prevent a reduction in power efficiency during an intermediate-load to high-load operation of the system as shown by a solid line in FIG. 11B.

Figure 12:
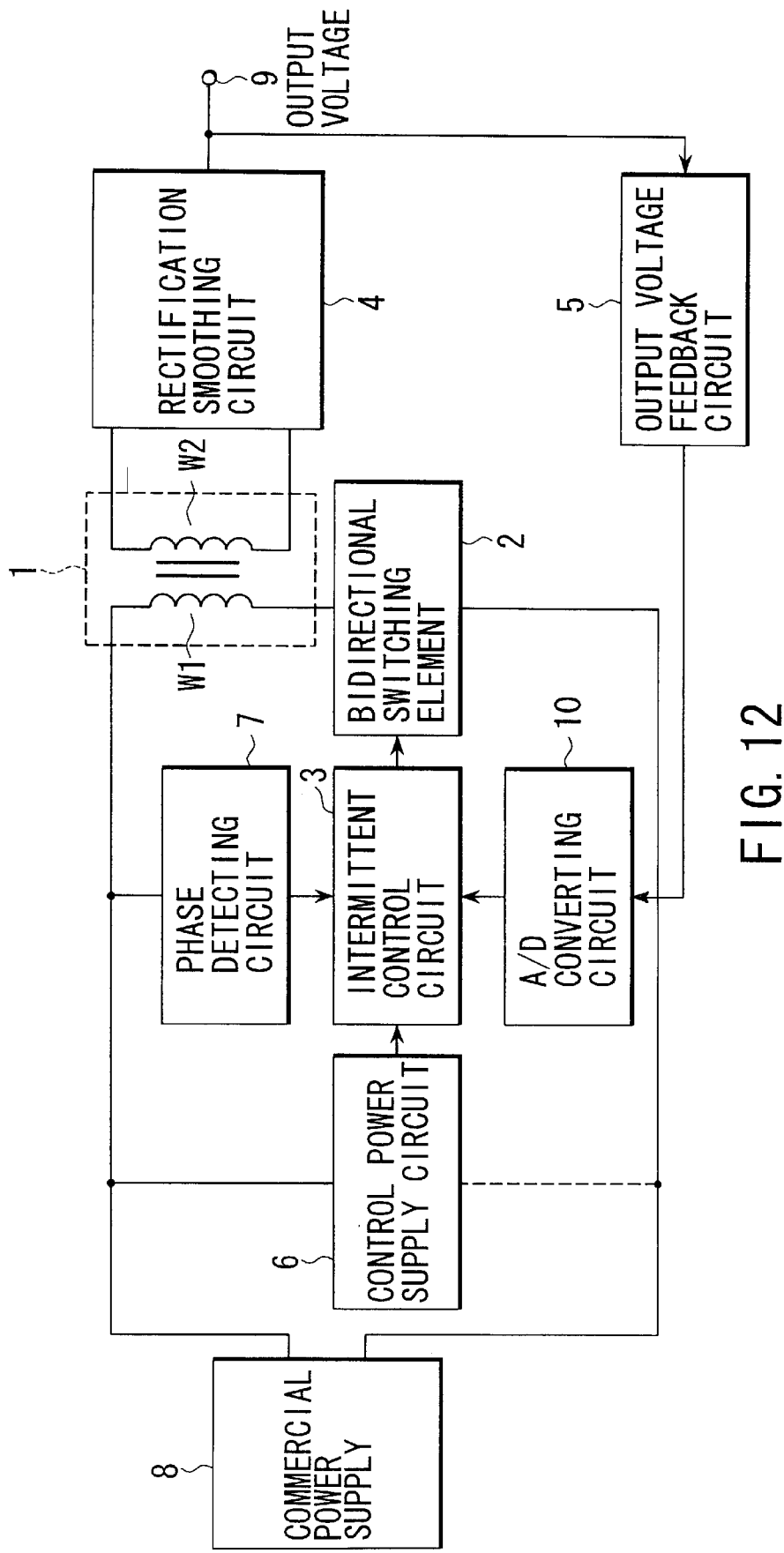
FIG. 12 is a block diagram for explaining the principle of still another embodiment of the present invention.

FIG. 12 is a block diagram showing a basic principle of the embodiment explained next. The basic principle of the embodiment will be first explained with reference to FIG. 12. Referring to FIG. 12, a primary winding W1 of a commercial frequency transformer 1 is connected in series with an AC commercial power supply 8 of, for example, 100 V and 50 Hz. A secondary winding W2 of the commercial frequency transformer 1 has a winding rate to enable a voltage of 100 V to fall to a few volts, for example. The dropped voltage is converted into a DC voltage by a rectification smoothing circuit 4 and is then output from an output terminal 9. The output voltage appearing at the output terminal 9 is supplied to an output voltage feedback circuit 5. An A/D converting circuit 10 receives an output signal from the output voltage feedback circuit 5.

A control input terminal of the bidirectional switch device 2 is connected to a control output terminal of an intermittent control circuit 3. The intermittent control circuit 3 is connected to receive an output signal of the A/D converting circuit 10 and a detection signal of a phase detecting circuit 7. The intermittent control circuit 3 operates by receiving a supply of control power converted into a DC voltage from a control power supply circuit 6 that is connected to the commercial power supply 8. The whole units shown in FIG. 12 constitute the power supply unit of the present embodiment.

The operation of the circuit shown in FIG. 12 will be explained next. The commercial frequency transformer 1 is provided with the primary and secondary windings W1 and W2 to have a close connection to a core material of a compact EI silicon steel plate, that is, to have no leakage flux. A winding rate is determined based on a rate of a voltage of the used commercial power supply 8 to a necessary output voltage. The bidirectional switch device 2 carries out a bidirectional switching of an AC. For the bidirectional switch device 2, there is used a TRIAC, a pair of series high-withstanding voltage FETs common to the source, or a diode bridge (D10 to D13) plus a high withstanding voltage FET (Q10) as shown in FIG. 8, according to the specifications of embodiments.

The intermittent control circuit 3 is mainly constructed of a logic circuit, and generates a signal for ON/OFF controlling the bidirectional switch device 2 at a timing synchronous with a predetermined phase of the commercial power supply 8 based on a timing signal from the phase detecting circuit 7. The rectification smoothing circuit 4 has a function of rectifying a voltage generated at a secondary side of the commercial frequency transformer 1 with the rectifying device or the like, and smoothing a generated pulsating current with a large-capacity capacitor.

The output voltage feedback circuit 5 has a function of comparing the output voltage of the rectification smoothing circuit 4 with the reference voltage Vref, and providing a negative feedback of a difference voltage to the intermittent control circuit 3 via the A/D converting circuit 10. For example, when the output voltage decreases, the volume of feedback to the intermittent control circuit 3 decreases, and the bidirectional switch device 2 has a higher rate of ON time. On the other hand, when the output voltage increases, the volume of feedback to the intermittent control circuit 3 increases and the bidirectional switch device 2 has a higher rate of OFF time. However, the ON/OFF timing of the bidirectional switch device 2 by the intermittent control circuit 3 based on the negative feedback volume from the output voltage feedback circuit 5 is synchronous with a predetermined phase of the commercial power supply based on the timing signal from the phase detecting circuit 7 as described in detail later. As explained above, the output voltage is held at almost a constant level regardless of variations in the load.

According to the systems of the embodiments explained above, for example, in the case of the synchronous ON/OFF system shown in FIG. 2, a feedback signal has been processed by two values of "H" and "L". In the embodiments to be described later, a system is constructed to be able to detect a plurality of voltages such as four values or three values via the A/D converting circuit 10. When an output voltage has deviated from a voltage width of both ends of the four values or three values, a set terminal of reset terminal of a D flip-flop circuit DFF is operated directly to forcibly turn ON or turn OFF asynchronously. Thus, during an intermediate-load to high-load operation, it is possible to effectively prevent both a reduction in efficiency and an increase in ripple. This is the key point of the embodiment as explained below.

In other words, during a light-load operation, there is a small variation in output voltages due to a discharging. Therefore, in this case, an operation similar to that of the synchronous system shown in FIG. 2 is carried out. Particularly, during a light-load operation, the current conduction time of a commercial frequency transformer 1 is shortened, and the quiescent time is set longer. As a result, copper loss and iron loss of the transformer 1 are reduced, with improved power efficiency of the power supply system.

During an intermediate-load to high-load operation period, there is a large variation in the output voltage due to a discharging of a large-capacity capacitor C5 of the rectification smoothing circuit 4. Thus, the frequency of the output voltage deviating from the voltage width increases, and there is a high probability that the system is turned ON or OFF asynchronously. Accordingly, the timing of a current conduction or non-conduction becomes asynchronous (pseudo-synchronous) type during an intermediate-load to high-load period. As a result, it is possible to avoid the phenomenon of a reduction in efficiency during an intermediate-load to high-load operation that is observed in the case of the synchronous type in FIG. 11A and FIG. 11B.

An embodiment having a construction based on the above-described principle shown in FIG. 12 will now be explained in detail. Portions corresponding to those in FIG. 12 are attached with like reference numbers.

A Four-value Detection Type System

Figure 13:
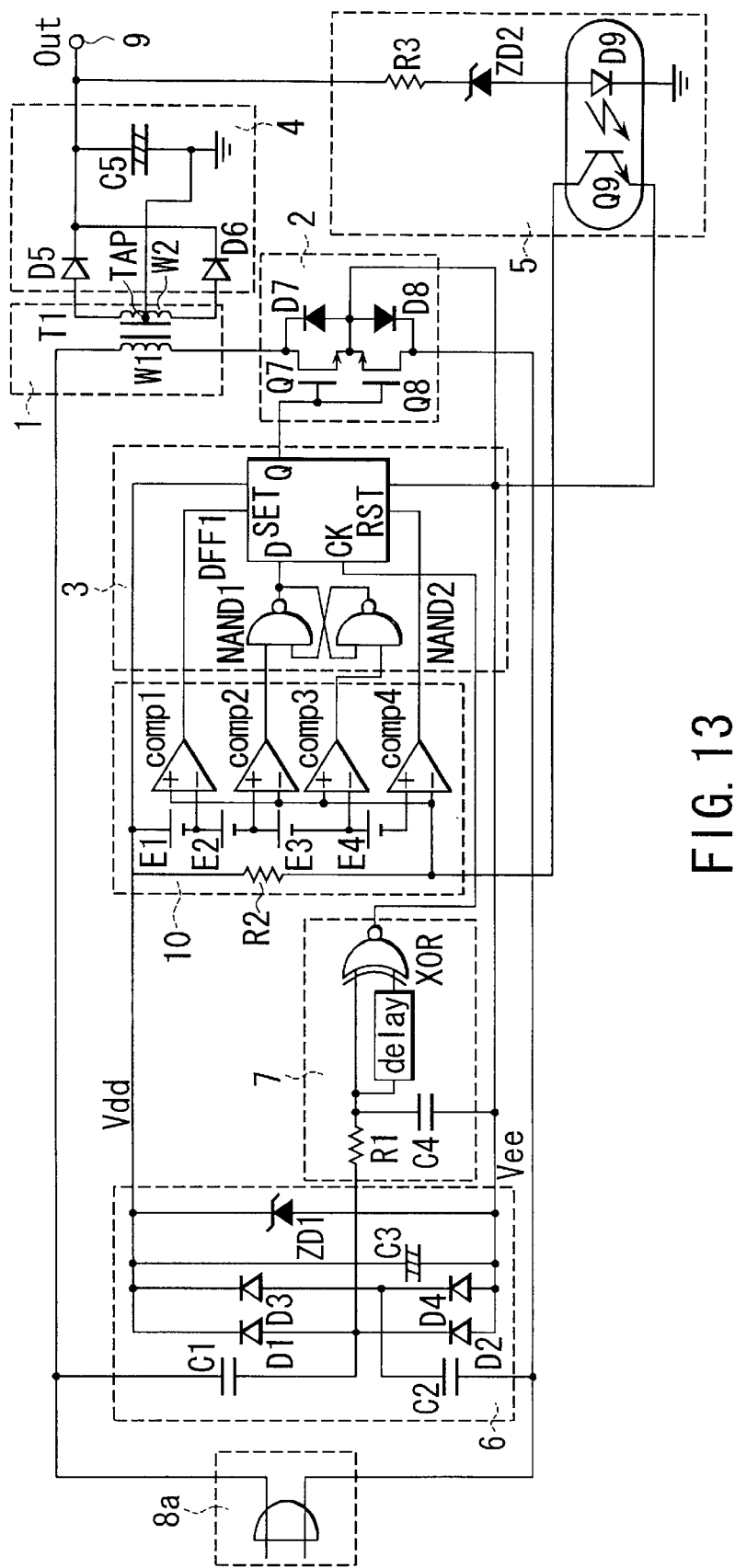
FIG. 13 is a circuit diagram showing the embodiment based on the principle shown in FIG. 12.

FIG. 13 shows an example of a circuit of a four-value detection type system. In FIG. 13, elements of reference numbers 1 to 10 correspond to those of 1 to 10 in FIG. 12 respectively. An intermediate tap TAP is provided at a secondary winding W2 of a commercial frequency transformer 1. Both terminals of the secondary winding W2 are connected to one end of a large-capacity smoothing capacitor C5 through rectification diodes D5 and D6 within a rectification smoothing circuit 4, and are also connected to an output terminal 9. The other end of the smoothing capacitor C5 is grounded together with the intermediate tap TAP.

A bidirectional switch circuit 2 has two N-channel MOSFETs Q7 and Q8 connected in series, with a source in common, between a primary winding W1 of the transformer 1 and one terminal of a commercial power supply 8. A gate is connected in common to a Q output terminal of an intermittent control circuit 3 to construct the bidirectional switch. The diodes D7 and D8 are parasitic diodes, and are connected between a source and a drain of the N-channel MOSFETs Q7 and Q8 respectively. A source-common connected node of the N-channel MOSFETs Q7 and Q8 is connected to a negative (Vee) side output terminal of a power supply circuit 6, together with a common-connected node of the parasitic diodes D7 and D8.

The intermittent control circuit 3 is constructed of an edge-trigger D flip-flop DFF1 and two input NAND gates of NAND1 and NAND2. The two input NAND gates have their input and output terminals mutually connected by crossing to form what is called an RS flip-flop. The remaining two input terminals of the NAND gates form a set input and a reset input. A positive-side power supply terminal of the edge-trigger type D flip-flop DFF1 is connected to a positive (Vdd) side output terminal of the power supply circuit 6 together with the pull-up resistor R2. A negative-side power supply terminal is connected to the Vee terminal. A Q output terminal of the edge-trigger type D flip-flop DFF1 is connected to the gate-common connection point of the MOSFETs Q7 and Q8 of the bidirectional switch 2. A clock (CK) input terminal of the edge-trigger type D flip-flop DFF1 is connected to an output terminal of an exclusive OR circuit XOR that is an output terminal of a phase detecting circuit 7. The data (D) input terminal of the edge-trigger type D flip-flop DFF1 is connected to an output terminal of the NAND gate NAND1.

An output voltage feedback circuit 5 consists of a Zener diode ZD2 for giving a reference voltage Vref, a current control resistor R3 connected between the Zener diode ZD2 and the output terminal 9, a light-emitting diode D9 sealed integrally within a package as a photo-coupler, and a light-receiving transistor Q9 optically connected with the light-emitting diode D9. A collector side of the light-receiving transistor Q9 is connected to a resistor R2 of an A/D converting circuit 10. The collector side is also connected to a +input terminal, a − input terminal, a + input terminal and a − input terminal of four comparators a comp1, a comp2, a comp3 and a comp4 respectively of the A/D converting circuit 10. An emitter side of the light-receiving transistor Q9 is connected to the Vee terminal.

An output of the comparator comp1 of the A/D converting circuit 10 is connected to a SET terminal of the edge D flip-flop DFF1, and an output of the comparator comp4 is connected to a RST terminal of the edge D flip-flop DFF1. An output of the comparator comp2 is connected to a remaining input terminal of the two-input NAND gate NAND1, and an output of the comparator comp3 is connected to a remaining input terminal of the two-input NAND gate NAND2.

Power supplies E1, E2, E3 and E4 for giving a reference voltage are connected in series. A positive side terminal of the E1 is connected to the Vdd. A connection point between the E1 and the E2 is connected to a − input terminal of the comp1. A connection point between the E2 and the E3 is connected to a + input terminal of the comp2. A connection point between the E3 and the E4 is connected to a − input terminal of the comp3, and a negative terminal of the E4 is connected to a + input terminal of the comp4.

The phase detecting circuit 7 consists of a combination of a resistor R1 and a capacitor C4 for constituting a low-pass filter, a delay element DL connected to a connection point between the resistor R1 and the capacitor C4, and the exclusive OR circuit XOR having a first input directly connected to the connection point between the resistor R1 and the capacitor C4 and a second input connected to an output side of the delay element DL. The other end of the capacitor C4 is connected to the Vee line. The other end of the resistor R1 is connected to one end of the commercial power supply 8 via the capacitor C1 in the control power supply circuit 6.

The construction of the control power supply circuit 6 for supplying DC operation power to the intermittent control circuit 3, the A/D converting circuit 10, etc. will be explained last. The control power supply circuit 6 consists of diodes D1 and D2 connected in series, a capacitor C1 connected to a connection point between the diodes D1 and D2 and to one (upper side) line of the commercial power supply 8, diodes D3 and D4 connected in series, a capacitor C2 connected to a connection point between the diodes D3 and D4 and to the other (lower side) line of the commercial power supply 8, a large-capacity smoothing capacitor C3 connected in parallel with the series-connected diodes D1 and D2 and D3 and D4, and a Zener diode ZD1 connected in parallel with the capacitor C3.

A DC voltage including a ripple component obtained by the diodes D1 to D4 is smoothed by the capacitor C3. A stable DC output restricted to within a range of predetermined values (Vdd, Vee) by the Zener diode ZD1 is obtained.

The bidirectional switch 2 can also be constructed of the diode bridge and the transistor as shown in FIG. 8 in a similar manner to that of the preceding embodiments.

The operation of the embodiment shown in FIG. 13 will be explained. FIG. 13 shows the embodiment that realizes the basic block shown in FIG. 12 in a practical circuit. The control power supply circuit 6 has a function of supplying operation power to a primary side control section of the transformer 1 consisting of the intermittent control circuit 3, the phase detecting circuit 7, and the A/D converting circuit 10.

Assume that there is no bidirectional switch 2. When a positive voltage has been applied to the upper line of the commercial power supply 8, a current flows to the capacitor C3 from the capacitor C1 via the diode D1. The current charges the capacitor C3 with a positive voltage applied to the Vdd side and a negative voltage applied to the Vee side. On the other hand, when a positive voltage has been applied to the lower line of the commercial power supply 8, the current flows to the capacitor C3 from the capacitor C2 via the diode D3. The current then charges the capacitor C3 with a positive voltage applied to the Vdd side and a negative voltage applied to the Vee side as well. As explained above, charge and discharge currents flow to the capacitors C1 and C2 according to a change in the amplitude of 50 Hz or 60 Hz of the commercial power supply 8, thereby charging the capacitor C3. The voltage of the capacitor C3 is controlled by the Zener diode ZD1 so as not to have an excess voltage.

In actual practice, the power supply circuit 6 is connected in parallel with a series circuit of the primary winding W1 of the transformer 1a and the bidirectional switch 2. Therefore, the route through which an electric charge is charged to the capacitor C3 changes depending on the ON/OFF state of the bidirectional switch 2 and the polarity of the input commercial power supply 8. FIG. 14 shows this state. As a similar state is shown in detail in FIG. 3, a detailed explanation will be omitted here.

When the bidirectional switch 2 is ON, the Vee line as the − power supply of the control section is connected to the lower line of the commercial power supply 8 via the transistor Q8. Therefore, without exception, this Vee line has a potential of the − side of the polarity of the input commercial power supply 8. As a result, no current flows to the capacitor C2, and the capacitor C2 does not operate, as can be understood from FIG. 14.

On the other hand, when the bidirectional switch 2 is OFF, there is no current route for charging and discharging unless there is the capacitor C2. Therefore, the capacitor C2 is essential in the example using the bidirectional switch 2 as shown in FIG. 13. Accordingly, both capacitors C1 and C2 are necessary as reactance droppers under the existence of both the ON mode and the OFF mode of the bidirectional switch 2.

The intermittent control circuit 3 consists of an edge-trigger type D flip-flop DFF1 having the SET and RST terminals, and two input NAND gates NAND1 and NAND2. An output Q of the intermittent control circuit 3 is controlled to "H" or "L" when the SET terminal or the RST terminal of the DFF1 becomes "H" regardless of the clock.

On the other hand, when both the SET terminal and the RST terminal are "L", the intermittent control circuit 3 operates as a normal edge-trigger type D flip-flop. A state of a terminal D of the DFF1 appears in the output Q at the rising of a pulse applied to the CK terminal. When the output Q becomes "H", the transistors Q7 and Q8 of the bidirectional switch 2 are turned ON.

The operation of the four-value detection type system shown in FIG. 13 will be explained with reference to FIG. 15. This system has five operation modes of a mode 1, a mode 2, a mode 3, a mode 4 and a mode 5.

Mode 1: This is a state that the output voltage Out of the output terminal 9 is substantially lower than the reference voltage Vref of the output voltage feedback circuit 5. The light-emitting diode D9 is not lighting, the light-receiving transistor Q9 is OFF, and both end voltages Er2 of the resistor R2 are almost zero. As this voltage is smaller than the comparative reference voltage E1, the output of the comparator comp1 of the A/D converting circuit 10 becomes "H" to drive the SET terminal of the D flip-flop DFF1. Thus, the output Q of the DFF1 is forcibly set to "H", thereby to forcibly turn ON the bidirectional switch 2.

Mode 2: This is a state that the output voltage Out of the output terminal 9 is close to the reference voltage Vref and the light-receiving transistor becomes slightly conductive. As the Er2 is between the E1 and the E1+ E2, both the SET and RST terminals become "L" and there is no forcible ON or OFF. A logic level "H" of the terminal D of the D flip-flop DFF1 appears at the rising timing of the clock of the CK terminal, that is, at a peak point of the input commercial power supply voltage, thereby synchronously turning ON the bidirectional switch 2.

Mode 3: This is a state that the output voltage Out of the output terminal 9 is equal to the reference voltage Vref. As the Er2 is between the E1+ the E2 and the E1+ the E2+ the E3, there is no forcible ON or OFF. As both comparators comp2 and comp3 produce outputs of "H", the RS flip-flop constructed of the NAND gates NAND1 and NAND2 maintains the preceding state. In other words, the bidirectional switch maintains the ON or OFF state immediately before, thereby forming a hysteresis area.

Mode 4: This is a state that the output voltage Out of the output terminal 9 slightly exceeds the reference voltage Vref. As the Er2 is between the E1 +the E2 +the E3 and the E1 +the E2 +the E3 +the E4, there is no forcible ON or OFF. As the terminal D is "L", the output Q is set to "L" at the rising point of the clock, thereby synchronously turning OFF the bidirectional switch 2.

Mode 5: This is a state that the output voltage Out of the output terminal 9 substantially exceeds the reference voltage Vref. As the Er2 is larger than the E1 +the E2 +the E3 +the E4, the output of the comparator comp4 becomes "L" to drive the RST terminal of the D flip-flop DFF1. Thus, the output Q of the DFF1 is forcibly set to "L", thereby to forcibly turn OFF the bidirectional switch 2.

Based on the above setting, during a light-load operation, the system operates as a synchronous system in the mode 2 to the mode 4, and achieves high power-efficiency. During a high-load operation, the system operates by mainly utilizing the mode 1 area, and prevents both a rise in ripple and reduction in power efficiency.

It is considered that the synchronous ON/OFF system of the embodiment detailed in FIG. 2 is a system utilizing the modes 2, 3 and 4 in FIG. 15. Similarly, the synchronous ON and asynchronous OFF system shown in FIG. 5 is considered a system utilizing the modes 2, 3 and 5 in FIG. 15. The asynchronous ON and synchronous OFF system shown in FIG. 6 is considered a system utilizing the modes 1, 3 and 4 in FIG. 15. The asynchronous (pseudo-synchronous) ON/OFF system shown in FIG. 7 is considered a system utilizing the modes 1, 3 and 5 in FIG. 15. All the systems include the mode 3 as each case assumes that the comparing function has a hysteresis. Therefore, it can be considered that in the embodiments shown in FIG. 12 afterwards, the A/D converting circuit 10 has a plurality of comparing functions, thereby to clear the problems of the preceding embodiments. In other words, the embodiments shown in FIG. 12 afterwards have achieved a further improvement by having cleared the problems of a reduction in efficiency and an increase in an output ripple during an intermediate-load to high-load operation.

In the embodiment of FIG. 13, it is important that the rising timing of the clock coincides with a peak value of the commercial power supply input voltage waveform, for the following reason. As the phase detection is taken from the connection point between the capacitor C1 and the diode D1, the current phase of this connection point is advanced by 90 degrees from the input voltage waveform. A zero-cross point of this connection point corresponds to a peak position of the input voltage waveform. A differential value of the voltage waveform becomes near zero, which is the timing when the primary side of the commercial frequency transformer 1 is turned ON. This timing is preferable in that a rush current to the inductance by the transformer 1 becomes small.

The resistor R1 and the capacitor C4 in the phase detecting circuit 7 form a low-pass filter for removing input noise. This low-pass filter can be omitted and is not necessarily an essential circuit when there is no noise problem. The delay element DL consists of a delay circuit, and this determines a pulse width of the clock pulse that is input to the CK terminal of the D flip-flop DFF. This delay element DL can also be formed to have a desired delay by connecting a plurality of inverters in cascade.

As explained above, according to the embodiment shown in FIG. 13, as the ON timing of the bidirectional switch 2 is fixed to the timing of the peak of the power supply voltage, it is possible to maintain high power-efficiency during a light-load operation. Particularly, as a differential value is zero at the peak timing of the input voltage, this is convenient as this peak point corresponds to a zero-cross of the current in the case of the inductance load of the transformer or the like. Further, during an intermediate-load to high-load operation period, the bidirectional switch 2 is forcibly turned ON when a reduction in the output voltage becomes large. Therefore, the system gradually shifts from the synchronous type to the asynchronous type. As a result, it is possible to prevent both a reduction in power efficiency and an increase in an output ripple.

A Three-value Detection Type System

Figures 16, 17:
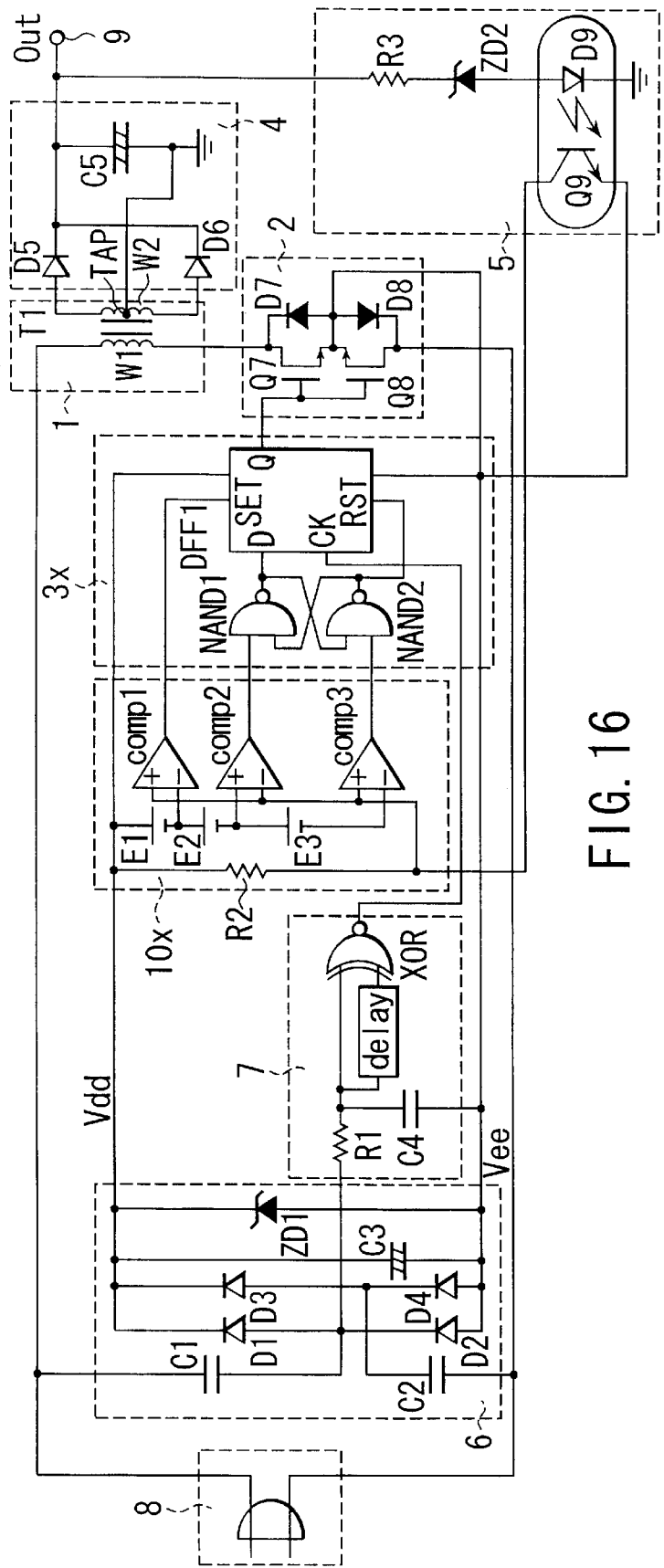
FIG. 16 is a circuit diagram showing still another embodiment of the invention.
FIG. 17 is a diagram for explaining a difference in the operation depending on high and low output voltages in the embodiment shown in FIG. 16.

FIG. 16 shows a circuit diagram of a three-value detection type system. Except blocks 3x and 10x, blocks from 1 to 10 have similar structures to those in FIG. 13. These blocks are attached with like reference numbers, and their detailed explanation will be omitted.

The circuit of FIG. 16 is different from the circuit of FIG. 13 in that the comparator com4 and the commercial power supply E4 have been removed from the A/D converting circuit 10x, and that an RST terminal of a D flip-flop DFF1 of the intermittent control circuit 3x has been connected to the output of a NAND gate NAND2. With the above alterations, the number of operation modes is reduced to four in states as shown in FIG. 17.

The asynchronous OFF mode corresponding to the mode 4 in FIG. 15 is omitted from FIG. 17. The three-value detection type system is characterized in that when the output voltage of a rectification smoothing circuit 4 is slightly higher than a reference voltage Vref, the system does not become the synchronous mode but becomes the forcible OFF mode. It has been confirmed by experiments that the synchronous OFF mode is not necessarily required. Based on the three-value detection type system, it is possible to achieve performance equivalent to that of the four-value detection type system, in a more simple structure.

As explained above, the three-value detection type system is characterized in that it is possible to achieve performance equivalent to that of the four-value detection type system, in a simple structure. Further, it is possible to prevent both a reduction in efficiency and an increase in an output ripple during an intermediate-load to high-load operation period.

Figure 18:
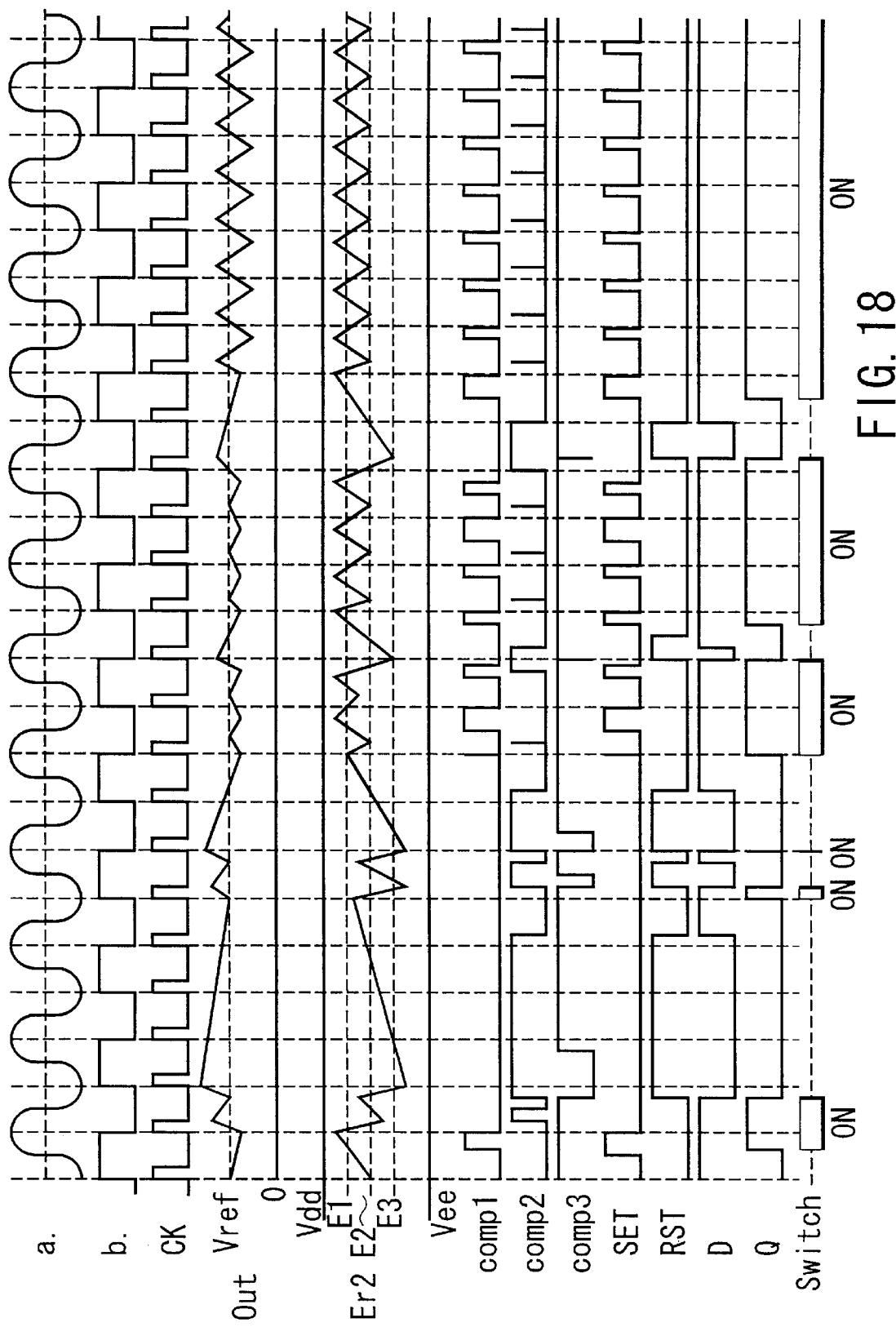
FIG. 18 is a time chart showing the operation of the embodiment shown in FIG. 16.

FIG. 18 shows a timing diagram of the three-value detection type system. In FIG. 18, a waveform a shows a voltage waveform of a commercial power supply 8 based on the lower line, and a waveform b shows an input voltage waveform of a phase detecting circuit 7 based on Vee. CK shows a clock input waveform of a D flip-flop DFF1 within the intermittent control circuit 3x based on the Vee. A waveform Out shows an output voltage waveform of the rectification smoothing circuit 4 based on the ground potential, with a ground potential 0 indicated by a thick line and a specific reference voltage Vref indicated by a broken line. A waveform Er2 shows a voltage generated at the lower end of a resistor R2 in the A/D converting circuit 10x. Power supply rail voltages Vdd and Vee at this portion are indicated by thick lines, and threshold voltages of comparators cmp1, cmp2 and comp3 are indicated by three broken lines. Next, output waveforms of the comparators comp1, the comp2 and the comp3 are shown. A waveform SET shows a waveform applied to a SET terminal of the D flip-flop DFF1. A waveform RST shows a waveform applied to an RST terminal of the D flip-flop DFF1. A waveform D shows an input waveform of a data input D of the D flip-flop DFF1, and a waveform Q shows a waveform of an output Q of the D flip-flop DFF1. Switch shows a current conductive state of a bidirectional switch 2. The horizontal axis is a time axis. The load increases gradually from the left to the right direction. It can be understood from this timing diagram that the rate of ON time of the bidirectional switch 2 increases along with the lapse of time.

An Embodiment Provided with a Short-circuit Protection Circuit

FIG. 19 shows a circuit construction. The whole power supply system is exactly the same as that of the three-value detection type system shown in FIG. 16. The system shown in FIG. 19 is different from that of FIG. 16 in that an excess current detecting unit 11 has been added and the output voltage feedback circuit 5 has been changed to 5X. The − output terminal of a rectification smoothing circuit 4 is not grounded but is connected to an emitter electrode of a transistor QD1 of the excess current detecting unit 11.

An output current passes through a route of a diode D5 or D6, an output terminal 9, a load (not shown), a ground terminal, a resistor R6, a resistor R5, and an intermediate tap TAP of a commercial frequency transformer 1.

During a light-load period, a voltage drop of the resistor R5 does not reach a base emitter forward voltage VF of the transistor QD1. Therefore, the transistor QD1 is in the OFF state. In this case, the reference voltage Vref of the output voltage feedback circuit 5X is approximately the sum of a voltage of a Zener diode ZD2 and a forward voltage of a light-emitting diode D9, and a normal output voltage is obtained at the output terminal.

On the other hand, when a load current increases and the voltage drop of the resistor R5 reaches the VF of the transistor QD1, the transistor QD1 is turned ON to shunt a series circuit of a resistor R3 and the Zener diode ZD2. Thus, the reference voltage of the output voltage feedback circuit 5X is lowered to only the forward voltage of the light-emitting diode D9. Therefore, the bidirectional switch 2 is turned OFF at a lower voltage, and the voltage balances when the voltage of the resistor R5 has dropped to the VF level of the transistor QD1. Accordingly, when the output current is expressed as IL, a constant-current output mode is obtained when the output current IL becomes equal to VF/R5. In this case, what is called a drooping characteristic can be obtained.

The resistor R6 is for securing a voltage applied to the light-emitting diode D9 at the time of a short-circuiting of the output. The resistor R4 is for limiting a current that flows to the light-emitting diode D9 in a constant-current mode when the transistor QD1 is turned ON.

Other Method for Realizing the A/D Converter 10

(a) FIG. 20A shows an example of an A/D converting circuit 10z that can be applied to a three-value detection type system constructed of a hysteresis inverter and an inverter that offsets an input threshold voltage by adjusting a W/L rate of a MOSFET.

In FIG. 20A, one end of a resistor R2 is connected to a power supply line Vdd. The other end of the resistor R2 is connected with a common input terminal of two inverters INV11 and INV12. An output terminal of the inverter INV11 is connected to a set terminal SET of a D flip-flop DFF1 of an intermittent control circuit 3z via an inverter INV13. The inverter INV12 is connected to a D terminal of the D flip-flop DFF1 via an inverter INV14, and is also connected to a reset terminal RST.

The inverter INV11 is an inverter for which a high input threshold voltage is set by the above-described method, and the INV12 is an inverter provided with a hysteresis. A high-voltage side of the hysteresis is set lower than the threshold voltage of the INV11. It is possible to detect three-value voltages equivalently by the inverters INV11 and INV12. When a voltage Er2 generated in the resistor R2 is small, the output of the INV11 first becomes "L". The output of the INV13 is set to "HI" to drive the SET terminal of the D flip-flop DFF1, and the output of a drive Q output is set to "H", thereby to forcibly turn ON the bidirectional switch 2. When the Er2 becomes slightly larger, the drive level of the SET terminal becomes "L", and there is no forcible ON. However, the bidirectional switch 2 still maintains the ON state by the latch operation of the DFF1. At this time, the threshold voltage of the INV12 is at a lower level by the hysteresis. Therefore, the output of the INV12 is "L", and the output of the INV14 provided in place of the NAND gate in the intermittent control circuit 3z, that is, the D input of the DFF1, becomes "H". When a rise of the clock pulse has been input to the clock terminal CK, there is no change as the Q output is originally "H". When the Er2 has become further slightly larger, the output of the INV12 becomes "H" by exceeding the lower threshold of the INV12 to drive the reset terminal RST of the DFF1. The output Q is set to "L" to forcibly turn OFF the bidirectional switch 2. At this time, the D input of the DFF1 is already "L" via the INV14. However, as the Q is already "L", there is no influence.

On the other hand, consider a case where the operation is started in a state of a high output voltage Out. First, as the Er2 is sufficiently large, the output of the INV12 becomes "HI" to drive the RST terminal to forcibly set the bidirectional switch to the OFF state. When the output voltage of the output terminal 9 has gradually lowered and the Er2 has become slightly smaller to reach the upper threshold voltage of the INV12, the output of the INV12 becomes "L" and the output of the INV14 becomes "H". At the next rising timing of the clock, the Q output of the DFF1 becomes "H", and the bidirectional switch 2 is synchronously turned ON. When the Er2 becomes further smaller, the output of the INV11 becomes "L", and the output of the INV13 becomes "H", thereby to forcibly set the DFF1. Thus, the bidirectional switch 2 is forcibly turned ON. As explained above, during a light-load operation, the Er2 repeats ON and OFF within the hysteresis voltage range of the INV12. During a high-load operation, the Er2 repeats ON and OFF with high frequency within a voltage range between the threshold voltage of the INV11 and the lower threshold voltage of the INV12.

(b) FIG. 20B shows an example of the A/D converting circuit 10 that makes it possible to carry out a three-value detection equivalently, by dividing the resistor R2 into three resistors of R21, R22 and R23, as shown by 10zz. The three resistors R21, R22 and R23 are connected in series. Input terminals of inverters INV1, INV2 and INV3 are connected to a connection point between the resistors R21 and R22, a connection point between the resistors R22 and R23, and to the other end of the resistor R23, respectively. An output terminal of the inverter INV1 is connected to one input terminal of a NAND gate NAND2 that constitutes an intermittent control circuit 3x via an inverter INV4. The inverter INV2 is directly connected to one input terminal of a NAND gate NAND1. The inverter INV3 is connected to a set terminal of a D flip-flop DFF1 via an inverter INV5. The other input terminals of the NAND gates NAND1 and NAND2 respectively are connected to output terminals of the NAND2 and the NAND1 respectively. The output terminal of the NAND gate NAND1 is further connected to a D terminal of the D flip-flop DFF1, and the output terminal of the NAND gate NAND2 is connected to a reset terminal RST.

An operation when a total voltage Er2 of the series resistors of the R21 to R23 is small (that is, an output voltage Out of an output terminal 9 is low) will be considered first.

In this case, all the outputs of the INV1, the INV2 and the INV3 are "L". Accordingly, the output of the INV5, that is, a set input SET of the DFF1 is driven to "HO". A Q output becomes "HI" immediately and a bidirectional switch 2 is turned ON forcibly. As the output of the INV2 connected to the NAND1 of the intermittent control circuit 3x shown in FIG. 20B is "L", the D input of the DFF1 becomes "H". However, as the DFF1 has been forcibly ON, there is no change in the state.

When the Er2 gradually increases, the output of the INV3 of the A/D converting circuit 10zz in FIG. 20B becomes "H", and the output of the INV5 becomes "L", thereby canceling the forcible SET. However, there is no change in the ON state by the latch operation of the D flip-fop DFF1. When the Er2 further increases, the output of the INV2 becomes "H". However, there is no change in the state by the latch effect of the NAND1 and NAND2.

When the Er2 further increases, the output of the INV1 also becomes "H", and the output of the INV4 becomes "L". The output of the NAND2 is set to "H" to drive the reset input terminal RST of the DFF1 to "H". Thus, the Q output is set to "H" to forcibly turn OFF the bidirectional switch 2.

Next, consider a case of starting an operation when the output voltage Out is at a high level. First, as the Er2 is large, all the outputs of the INV1, the INV2 and the INV3 start with "HI". As the outputs of the INV4 and the INV5 are "L", the output of the NAND2, that is, an RST terminal, becomes "H", thereby forcibly turning OFF the bidirectional switch.

When the Er2 becomes slightly smaller, the output of the INV1 becomes "L" and the output of the INV4 becomes "H". However, there is no change in the state. When the Er2 becomes further smaller, the output of the INV2, that is, the input of the INV1, becomes "L" and the D input becomes "H". This is the synchronous ON mode. When the Er2 becomes further smaller, the output of the INV3 becomes "L" and the output of the INV5 becomes "H" to turn the SET terminal to "H", thereby forcibly turning ON the bidirectional switch.

It can be understood from the above explanation that both the A/D converting circuit 10z in FIG. 20A and the A/D converting circuit 10zz in FIG. 20B carry out operation equivalent to that of the A/D converting circuit 10z in FIG. 16.

A Pseudo-synchronous System Added with a Phase-shifting Circuit

FIG. 21 shows a pseudo-synchronous system that has been set to an optimum state by shifting the phase of an output ripple of a rectification smoothing circuit 4 by a phase-shifting circuit PS. An optical AC switch 2x connected to a latter stage of an output voltage feedback circuit 5y is a normally-on type switch. The AC switch 2x is turned ON when a light-emitting diode D9 is turned OFF. When the D9 is turned ON, the AC switch 2x is turned OFF. Elements of reference numbers 1, 4, 8 and 9 correspond to those elements of the identical reference numbers in FIG. 12. The output voltage feedback circuit 5y consists of a phase-shifting circuit PS, a Zener diode ZD2, and the light-emitting diode D9 within the optical AC switch 2x.

Consider a case where there is no phase-shifting circuit PS. When an output voltage Out of an output terminal 9 is lower than a reference voltage Vref, the light-emitting diode D9 does not emit light and the optical AC switch 2x becomes conductive. A pulsating current involving a ripple appears in the rectification smoothing circuit 4. When a peak value of the ripple exceeds the reference voltage Vref, the light-emitting diode D9 emits light and the optical AC switch 2x is turned OFF. Thus, an average value of the output value Out of the output terminal 9 is stabilized approximately near the reference voltage Vref.

On the time axis, the optical AC switch 2x is turned ON at a bottom timing of the ripple, and this corresponds to a point near a zero-cross point of an input commercial power supply voltage. It has been known by experiments that it is effective for improving power efficiency to turn ON the optical AC switch 2x at a timing near the peak value of the input commercial power supply voltage.

When the phase of the ripple waveform is deviated by 90 degrees by inserting the phase-shifting circuit PS, it is possible to turn ON the optical AC switch 2x at a timing near the peak value of the input commercial power supply voltage. As a DC current needs to be passed through the phase-shifting circuit PS, it is possible to achieve the object by a two-stage low-pass filter of a CR having the cut-off frequency matched with the ripple frequency.

The timing for turning OFF the optical AC switch 2x is at a point near a peak of the output ripple voltage. As the phase of the ripple waveform is shifted by 90 degrees by the phase-shifting circuit PS, there is a high probability that this timing is near a zero-cross point of the input commercial power supply voltage. However, when the output voltage Out at the terminal 9 is lower than the reference voltage Vref, the optical AC switch 2x is forcibly turned ON. Therefore, the AC switch 2x is turned ON pseudo-synchronously at a peak of the input commercial power supply voltage, and is turned OFF asynchronously. Practically, this system carries out an operation almost equivalent to that of a two-value detection system explained next (FIG. 22).

For the above AC switch 2x, it is also possible to use a normally-on type optical TRIAC in place of a MOSFET type switch. In this case, the OFF timing becomes a current zero-cross point.

A Two-value Detection Type System

FIG. 22 shows a circuit diagram of a two-value detection type system. Blocks of this system are similar to those of the three-value detection type shown in FIG. 16, except blocks 3y and 10y. Therefore, a total circuit construction and a detailed description of the common parts will be omitted. The two-value detection type system is different from the three-value detection type in the following points. The comparator comp3 and the reference power supply E3 have been removed from the A/D converting circuit 10x, to provide a simple construction of the A/D converting circuit 10y as shown in FIG. 22. Further, the NAND gates NAND1 and NAND2 of the intermittent control circuit 3x have been removed. Further, an output of the comparator comp1 has been connected to a SET terminal of a D flip-flop DFF1, and an output of a comparator comp2 has been directly connected to an RST terminal of the DFF1. The two-value detection type system is not limited to the circuit shown in FIG. 22, and it is also possible to use two one-input gates with different input threshold voltages. In this case, the reference power supplies E1 and E2 can be omitted. When a slight hysteresis is provided in the gate, an output does not remain in the intermediate value, and a through-current of the N-channel MOS transistors and P-channel MOS transistors decreases. As a result, it is possible to further decrease power consumption.

With the above-described alternation, the number of operation modes is decreased to three as shown in FIG. 23.

FIG. 23 shows a state that an inconstant (a hysteresis area) operation corresponding to the mode 3 in FIG. 17 has been omitted. This two-value detection type system is characterized in that when the output voltage of a rectification smoothing circuit 4 is at the same level as a reference voltage Vref, the operation mode does not become inconstant but becomes a forcible OFF mode. Er2 repeats synchronous ON and asynchronous (forcible) OFF between E1 and E2 shown in FIG. 18, and is stabilized almost constantly by a corresponding output voltage Out. It has been confirmed by experiments that the two-value detection type system can achieve a function practically equivalent to that of the three-value detection type system.

The two-value detection type system is further characterized in that the effect equivalent to that of the three-value detection type system can be realized in a more simple construction, without a reduction in efficiency or an increase in an output ripple during an intermediate-load to rated-load operation.

In the embodiments shown in FIG. 12 afterwards, when a value of the resistor R2 used in the A/D converting circuit 10 is large, this resistor R2 needs to be provided externally in the case of providing the power supply in one chip. Thus, this hinders the provision of a compact system. Therefore, it is desired to construct the A/D converting circuit 10 without using a resistor of a large value.

Figure 24:
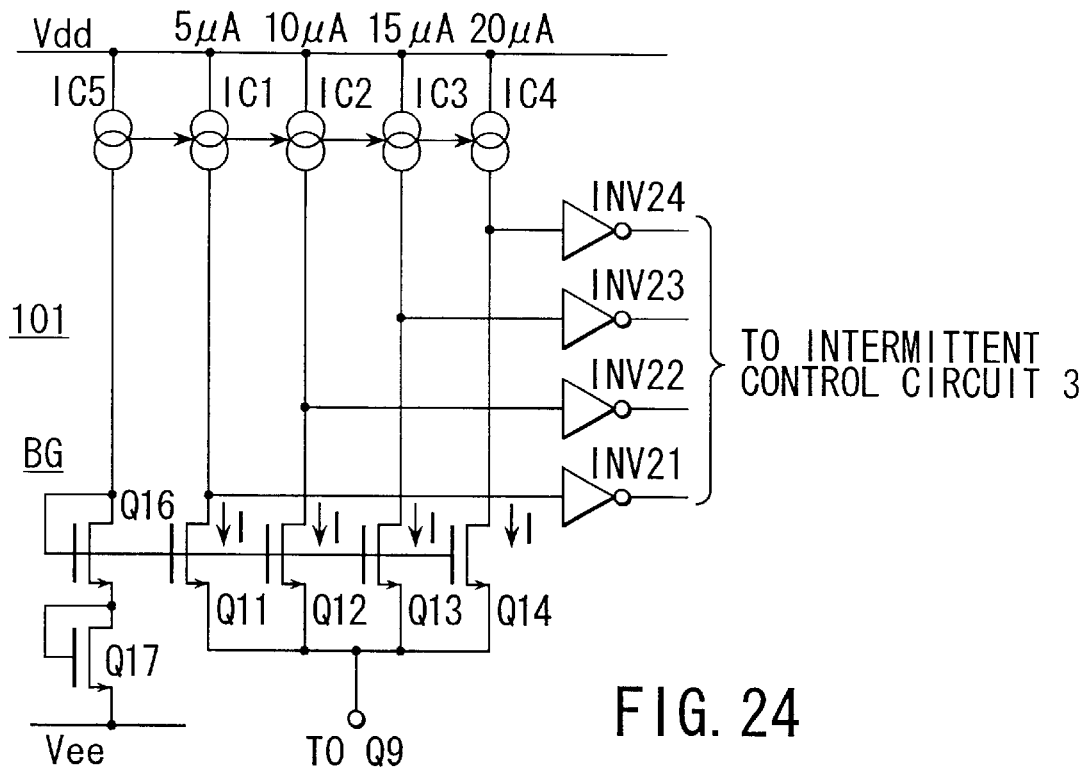
FIG. 24 is a diagram showing still another method of achieving an A/D converting circuit.

FIG. 24 is a diagram showing one example of this circuit construction. An A/D converting circuit 101 shown in FIG. 24 is what is called a current-comparison type circuit that can be applied to the four-value detection type system shown in FIG. 13. In FIG. 24, four constant-current sources IC1, IC2, IC3 and IC4 are set to 5 $\mu$A, 10 $\mu$A, 15 $\mu$A and 20 $\mu$A respectively.

N-channel MOS transistors Q11, Q12, Q13 and Q14 are connected in series respectively to the four constant-current power sources IC1, IC2, IC3 and IC4. Each source is connected in common to a light-receiving transistor Q9 of an output voltage feedback circuit 5. From respective intermediate points between the four constant-current power sources IC1, IC2, IC3 and IC4 and the N-channel MOS transistors Q11, Q12, Q13 and Q14, current-comparison outputs are taken out via four inverters INV21, INV22, INV23 and INV24 respectively. These current-comparison results are supplied to an intermittent control circuit 3 as four-value outputs.

Two N-channel MOS transistors Q16 and Q17 are diode-connected to construct a bias generating circuit BG. A bias voltage generated from a connection point between a drain and a gate of the transistor Q16 is supplied in common to each gate of the N-channel MOS transistors Q11, Q12, Q13 and Q14. The N-channel MOS transistors Q16 and Q17 are connected in series with a current source IC5 between power supplies Vdd and Vee.

An equal current I flows through each of the four N-channel MOS transistors Q11, Q12, Q13 and Q14. Therefore, one quarter of a current flowing through the transistor Q9 according to the load flows as the current I. When a value of the current I corresponding to this one quarter becomes larger than a current of the 5 $\mu$A set by the constant-current source IC1, for example, an output of the inverter INV21 changes from H to L. Therefore, the transistor Q11 can detect a change in the output current of up to four times of 5 $\mu$A, that is, 20 $\mu$A at the output Q9.

Similarly, the transistor Q12 can detect a change in the output current of up to four times of 10 $\mu$A, that is, 40 $\mu$A at the output Q9. The transistor Q13 can detect a change in the output current of up to four times of 15 $\mu$A, that is, 60 $\mu$A at the output Q9. The transistor Q14 can detect a change in the output current of up to four times of 20 $\mu$A, that is, 80 $\mu$A at the output Q9.

As explained above, current-comparison outputs of H and L are taken out via the four inverters INV21, INV22, INV23 and INV24 respectively, and are supplied to the intermittent control circuit 3 as four-value outputs. When a comparator circuit based on the transistor Q14 and the inverter INV24 connected to the constant-current source IC4 is omitted, for example, it is possible to construct a three-value detection type A/D converting circuit. Further, when a comparator circuit relating to the constant-current source IC3 is omitted, it is possible to construct a two-value detection type A/D converting circuit.

Figure 25:
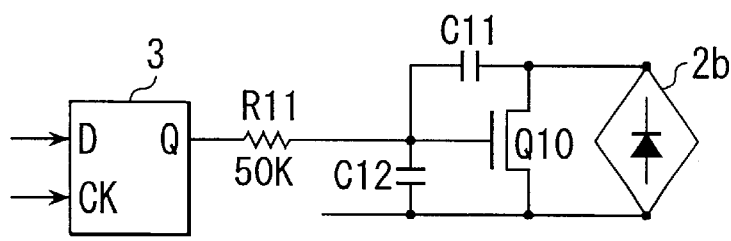
FIG. 25 is a circuit diagram showing an example of a noise prevention measure in a bidirectional switch device.

FIG. 25 shows one example of a measure for reducing noise generated at the ON/OFF switching time in a bidirectional switch 2b that consists of a combination of a diode bridge and a transistor Q10 as shown in FIG. 8.

A resistor R11 of about 50 K ohm is connected between a Q output terminal of an intermittent control circuit 3 and a gate of the transistor Q10. On the other hand, noise-preventing capacitors C11 and C12 are connected between a gate and a source and between a gate and a drain of the transistor Q10 respectively. The capacitor C11 may have a small capacity, but must have a large withstanding voltage. On the other hand, the capacitor C12 must have a large capacity, but may have a small withstanding voltage. One or both of the capacitors C11 and C12 are used according to the target of reducing switching noise.

Figure 26:
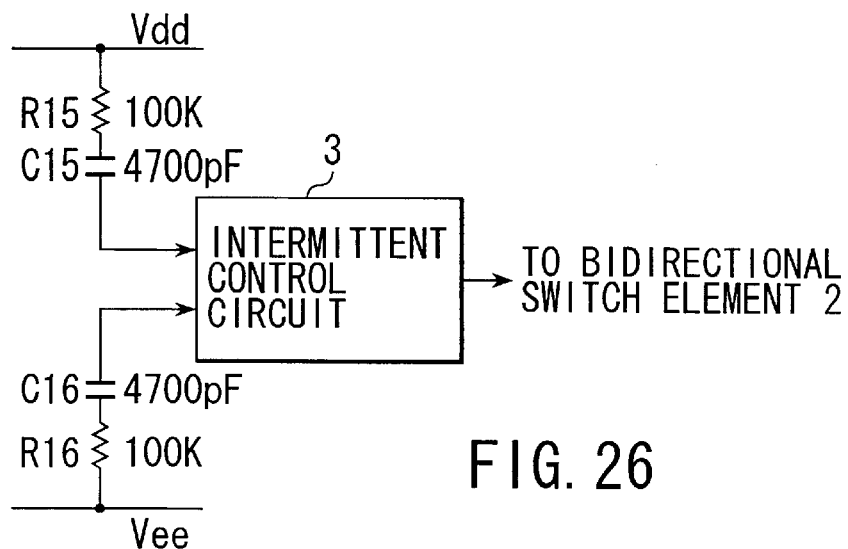
FIG. 26 is a diagram showing an example of a measure taken in an intermittent control circuit for preventing noise attributable to an ON/OFF operation of the bidirectional switch device.

FIG. 26 shows one example of a noise preventing circuit for preventing switching noise of a bidirectional switch 2 from affecting an intermittent control circuit 3. Along with a switching of the bidirectional switch 2, a pulsate power supply potential variation is transmitted to the intermittent control circuit 3. This has a risk of generating a malfunction of the intermittent control circuit 3. In order to prevent this risk, a resistor R15 of about 100 K ohm and a capacitor C15 of about 4,700 pF, for example, are inserted into a Vdd power supply circuit of the intermittent control circuit 3. Further, according to the need, a resistor R16 of about 100 K ohm and a capacitor C16 of about 4,700 pF, for example, are inserted into a Vee power supply circuit of the intermittent control circuit 3. The resistors R15 and R16 and the capacitors C15 and C16 need not take the same values respectively, and these values can be suitably changed.

As explained above, in the embodiments up to the one shown in FIG. 10, an analog value of an output voltage has been negatively fed back by converting the signal into a digital signal, by simply generating a control signal of "H" or "L". However, in the embodiments shown in FIG. 12 afterward, a fine control has been carried out based on a multi-value detection type A/D converting circuit having a plurality of comparing functions. Therefore, it is possible to avoid the phenomenon of a reduction in power efficiency during an intermediate-load to rated-load operation that has occurred in the synchronous system shown in FIG. 2, for example.

As described in detail in the above, according to the present invention, the commercial frequency transformer can be controlled intermittently.

Therefore, there is an advantage that it is possible to obtain high efficiency particularly during a light-load operation. Further, as a negative feedback of the output is carried out in a simple construction, the intermittent operation can be continuously changed step by step. In principle, it is possible to cover the whole period including an intermittent operation during a non-load quiescent period and a complete continuous operation during a rated load.

Therefore, depending on the variation in the load, it is possible to obtain regulation of high power-efficiency and a satisfactory output voltage over a wide range of operation from a super-light load operation to a rated-load operation.

Furthermore, as the commercial frequency is handled, it is possible to decrease unnecessary radiation that is observed in the high-frequency regulator. Thus, a power supply unit having various advantages can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply unit comprising:
    a transformer having a primary winding connected to an AC commercial power supply;
    a bidirectional switch unit connected in series between the primary winding and the AC commercial power supply;
    an AC/DC converting circuit connected to a secondary winding of the transformer to deliver a DC output voltage: and
    a switch control circuit for intermittently controlling an ON/OFF operation of the bidirectional switch unit according to an output of the AC/DC converting circuit and a cycle of the AC commercial power supply, the switch control circuit including an output voltage feedback circuit which delivers a feedback signal when the DC output voltage is less than a predetermined value, a phase detecting circuit which detects a peak value of an AC commercial power supply input to output a peak detection signal and a latch circuit which latches the feedback signal and turns on the bidirectional switch unit in response to the peak detecting signal when the feedback signal is latched in the latch circuit;
    wherein the bidirectional switch unit is not turned on for a plurality of cycles of the AC commercial power supply input, when no feedback signal is latched in the latch circuit.

2. A power supply unit according to claim 1, wherein the output voltage feedback circuit provides a negative feedback of the DC output voltage of the AC/DC converting circuit.

3. A power supply unit according to claim 2, wherein the phase detecting circuit generates a pulse signal having an edge that substantially coincides with the peak value of the AC commercial power supply input, and the latch circuit latches the feedback signal and carries out a synchronous ON/OFF control of the bidirectional switch unit based on the edge of this pulse signal.

4. A power supply unit according to claim 2, wherein the latch circuit generates a synchronous ON control signal for the bidirectional switch unit in response to an edge of the peak detection signal that substantially coincides with the peak value of the AC commercial power supply input and an asynchronous OFF control signal at a timing when the DC output voltage has exceeded the predetermined value.

5. A power supply unit according to claim 4, wherein the latch circuit includes an edge-trigger type D flip-flop which has a D input terminal connected directly to one end of the AC commercial power supply, a clock input terminal connected to receive the peak detection signal, a reset terminal connected to receive the feedback signal, and a Q output terminal connected to deliver a Q signal to the bidirectional switch unit.

6. A power supply unit according to claim 2, wherein
    the DC output voltage delivered from the AC/DC converting circuit includes a ripple component of the AC commercial power supply input, and
    the output voltage feedback circuit includes a comparing circuit for comparing the DC output voltage including the ripple component with the predetermined value to generate an OFF control signal as the feedback signal at a timing when the ripple component of the DC output voltage has become higher than the predetermined value, whereby the switch control circuit carries out a pseudo-synchronous OFF control of the bidirectional switch unit based on the OFF control signal.

7. A power supply unit according to claim 2, wherein
    the bidirectional switch unit includes a thyristor having a control gate, and
    the latch circuit generates ON and OFF control signals according to whether or not the feedback signal is latched in the latch circuit the ON and OFF control signals being supplied to the control gate of the thyristor, thereby to carry out asynchronous ON and synchronous OFF control of the bidirectional switch unit.

8. A power supply unit according to claim 2, wherein
    the bidirectional switch unit includes an optical TRIAC, and the output voltage feedback circuit has a light emitting diode that is turned OFF at a timing when the DC output voltage of the AC/DC converting circuit has become lower than the predetermined value to stop light emission and turn ON the optical TRIAC, whereby the switch control circuit carries out asynchronous ON and synchronous OFF control of the bidirectional switch unit by turning ON and OFF the light-emitting diode.

9. A power supply unit according to claim 2, wherein
    the latch circuit generates an asynchronous OFF control signal for the bidirectional switch unit in response to an edge of the peak detecting signal that substantially coincides with the peak value of the AC commercial power supply input and a synchronous ON control signal at a timing when the DC output voltage has become equal to or lower than the predetermined value.

10. A power supply unit according to claim 9, wherein the latch circuit includes an edge-trigger type D flip-flop which has a set input terminal connected to one end of the AC commercial power supply, a D input terminal connected to one end of a DC power supply, a clock input terminal connected to receive the peak detection signal, and a Q output terminal connected to deliver a Q signal to the bidirectional switch unit.

11. A power supply unit according to claim 1, wherein the latch circuit includes an edge-trigger type D flip-flop which has a D input terminal connected to receive the feedback signal, a clock input terminal connected to receive the peak detection signal, and a Q output terminal connected to deliver a Q signal to the bidirectional switch unit.

12. A power supply unit according to claim 1, further comprising a control power supply circuit which includes a diode bridge circuit having AC input terminals and DC output terminals, a first capacitor having a first end connected to one output of the commercial power supply and a second end connected to one of the DC output terminals, a second capacitor having a first end connected to the other end of the commercial power supply and a second end connected to the other of the DC output terminals.

13. A power supply unit comprising:

a commercial frequency transformer having a primary winding and a secondary winding;

a bidirectional switch unit having a latch function;

a rectification smoothing circuit connected to the secondary winding of the commercial frequency transformer; and an output voltage feedback circuit for feeding back a difference signal between an output of the rectification smoothing circuit and a reference voltage to the bidirectional switch unit via a light-emitting element, wherein said primary winding of the commercial frequency transformer and the bidirectional switch unit are connected in series to a commercial power supply, the light-emitting element controls the bidirectional switch unit to an OFF state when an output voltage of the rectification smoothing circuit is higher than the reference voltage and controls the bidirectional switch unit to an ON state when the output voltage is lower than the reference voltage, the OFF control is executed at a timing substantially synchronous with a point near a zero-cross point of a current flowing through the bidirectional switch unit by the latch function of the bidirectional switch, a substantially continuous mode is obtained around a maximum rating load, and an intermittent mode having an optional quiescent period is obtained during a light-load period.

14. A power supply unit according to claim 13, wherein the bidirectional switch unit and the light-emitting element for controlling the bidirectional switch unit are sealed in a package commonly.

15. A power supply unit comprising:

a transformer having a primary winding connected to an AC commercial power supply;

a bidirectional switch unit connected in series between the primary winding and the AC commercial power supply;

an AC/DC converting circuit connected to a secondary winding of the transformer; and a switch control circuit for controlling ON/OFF operation of the bidirectional switch unit according to an output voltage of the AC/DC converting circuit, wherein the switch control circuit includes a negative feedback circuit feeding back an output voltage of the AC/DC converting circuit, an analog/digital converting circuit converting the output voltage into a digital signal, a phase detection circuit which detects a peak value of an AC commercial power supply input to output a peak detection signal and a latch circuit latching the digital signal, and the switch control circuit controls the ON/OFF operation of the bidirectional switch unit based on at least a control mode of forcibly turning ON the bidirectional switch unit when the digital signal latched in the latch circuit represents that an output voltage of the AC/DC converting circuit is lower than a predetermined value in response to the peak detection signal of the AC commercial power supply input.

16. A power supply unit according to claim 15, wherein the ON/OFF operation of the bidirectional switch unit is controlled according to an output voltage of the AC/DC converting circuit and the peak detection signal of the AC commercial power supply input.

17. A power supply unit according to claim 15, wherein the analog/digital converting circuit is constructed of a DC voltage source for providing a plurality of reference voltages having mutually different values and a plurality of comparators.

18. A power supply unit according to claim 17, wherein the latch circuit includes an edge-trigger type D flip-flop which has a set terminal connected to an output of a first comparator of the comparators, a reset terminal connected to an output of a second comparator of the comparators, a D input terminal connected to an output of a third comparator of the comparators, a clock input terminal connected to receive the peak detection signal, and a Q output terminal connected to deliver a Q signal to the bidirection switch unit.

19. A power supply unit according to claim 17, wherein the latch circuit includes an edge-trigger type D flip-flop which has a set terminal connected to an output of a first comparator of the comparators, a reset terminal connected to an output of a second comparator of the comparators, a D input terminal connected to the output of the second comparator of the comparators, a clock input terminal connected to receive the peak detection signal, and a Q output terminal connected to deliver a Q signal to the bidirection switch unit.

20. A power supply unit according to claim 17, wherein the latch circuit includes an edge-trigger type D flip-flop which has a set terminal connected to an output of a first comparator of the comparators, a reset terminal connected to an output of a second comparator of the comparators, a D input terminal connected to one end of a DC power supply, a clock input terminal connected to receive the peak detection signal, and a Q output terminal connected to deliver a Q signal to the bidirection switch unit.

21. A power supply unit according to claim 15, wherein the analog/digital converting circuit is constructed of a plurality of resistors and inverter gates.

22. A power supply unit according to claim 15, wherein the analog/digital converting circuit is constructed of inverter gates with adjusted threshold voltages.

23. A power supply unit comprising:

a transformer having a primary winding connected to au AC commercial power supply;

a normally-ON type optical AC switching unit connected in series between the primary winding and the AC commercial power supply;

an AC/DC converting circuit connected to a secondary winding of the transformer to deliver a DC output voltage including an output ripple; and a control circuit for controlling ON/OFF operation of the normally-ON type optical AC switching unit according to the output ripple of the AC/DC converting circuit, wherein the control circuit includes an output voltage feedback circuit which delivers a feedback signal when the DC output voltage is less than a predetermined value, a phase detecting circuit which detects a peak value of an AC commercial power supply input to output peak detection signal and a latch circuit which latches the feedback signal and turns on the optical AC switching unit in response to the peak detecting signal when the feedback signal latched in the latch circuit; and the control circuit provides a negative feedback of an output of the AC/DC converting circuit via a phase-shifting circuit to control the ON/OFF operation of the normally-ON type optical AC switching unit.

24. A power supply unit according to claim 23, wherein the normally-ON type optical AC switching unit is constructed of a normally-ON type optical TRIAC unit.

25. A power supply unit comprising
a commercial frequency transformer having a primary winding and a secondary winding;
a bidirectional switch unit;
an intermittent control circuit for intermittently controlling the bidirectional switch unit;
a rectification smoothing circuit connected to the secondary winding of the commercial frequency transformer; and
an output voltage feedback circuit for feeding back a difference signal between an output voltage of the rectification smoothing circuit and a reference voltage to the intermittent control circuit, wherein
the intermittent control circuit including a latch circuit which latches difference signal fed back by the output voltage feedback circuit, the primary winding of the commercial frequency transformer and the bidirectional switch are connected in series to a commercial power supply, the intermittent control circuit is controlled based on the difference signal from the output voltage feedback circuit, and the intermittent control circuit controls the bidirectional switch unit to an OFF state when the difference signal represents that the output voltage is higher than the reference voltage and controls the bidirectional switch unit to an ON state when the output voltage is lower than the reference voltage, whereby a practically continuous mode is obtained during a prescribed-load period and an intermittent mode having an optional quiescent period is obtained during a light-load period.

26. A power supply unit according to claim 25, further comprising a control power supply circuit which includes a diode bridge circuit having AC input terminals and DC output terminals, a first capacitor having a first end connected to one output of the commercial power supply and a second end connected to one of the DC output terminals a second capacitor having a first end connected to the other end of the commercial power supply and a second end connected to the other of the DC output terminals wherein the intermittent control circuit includes a buffer circuit having ax least a hysteresis characteristic and being supplied with a DC output from the DC output terminals of the control power supply circuit.

27. A power supply unit according to claim 25, further comprising:
a control power supply circuit for supplying DC power to the intermittent control circuit; and
a phase detecting circuit for prescribing at least one of ON and OFF timings of the intermittent control circuit; wherein
the phase detecting circuit intermittently controls the bidirectional switch unit based on the difference signal latched in the latch circuit at a timing synchronous with the phase of a voltage or current of the commercial power supply for at least one of ON and OFF operations.

28. A power supply unit according to claim 27, wherein the output voltage feedback circuit includes a Zener diode that defines the reference voltage.

* * * * *